(12) United States Patent
Chow et al.

(10) Patent No.: US 10,536,799 B2
(45) Date of Patent: Jan. 14, 2020

(54) INTELLIGENT GEO-FENCING WITH TRACKED AND FENCED OBJECTS

(71) Applicant: Taiwan Semiconductor Manufacturing Co., Ltd., Hsinchu (TW)

(72) Inventors: Jerry Chow, San Diego, CA (US); Kenneth Stanwood, San Diego, CA (US); Erik Colban, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 681 days.

(21) Appl. No.: 15/198,944

(22) Filed: Jun. 30, 2016

(65) Prior Publication Data

US 2017/0026787 A1     Jan. 26, 2017

Related U.S. Application Data

(63) Continuation-in-part of application No. 14/966,970, filed on Dec. 11, 2015, now Pat. No. 10,003,919.

(60) Provisional application No. 62/189,152, filed on Jul. 6, 2015, provisional application No. 62/112,568, filed on Feb. 5, 2015, provisional application No. 62/090,578, filed on Dec. 11, 2014.

(51) Int. Cl.
| | |
|---|---|
| *H04W 4/02* | (2018.01) |
| *H04W 4/021* | (2018.01) |
| *G01S 5/02* | (2010.01) |
| *H04W 4/029* | (2018.01) |
| *G01S 13/82* | (2006.01) |
| *G01S 5/14* | (2006.01) |

(52) U.S. Cl.
CPC ......... *H04W 4/021* (2013.01); *G01S 5/0242* (2013.01); *G01S 5/0247* (2013.01); *G01S 13/825* (2013.01); *H04W 4/029* (2018.02); *G01S 5/14* (2013.01); *H04W 4/023* (2013.01); *H04W 4/026* (2013.01)

(58) Field of Classification Search
CPC ........ H04W 4/02; H04W 4/021; H04W 4/026
See application file for complete search history.

(56) References Cited

U.S. PATENT DOCUMENTS

| | | |
|---|---|---|
| 6,721,652 B1 | 4/2004 | Sanqunetti |
| 6,983,202 B2 | 1/2006 | Sanqunetti |

(Continued)

OTHER PUBLICATIONS

Michael Viot; Automotive Security: Why UWB Measures Up; Embedded Systems Engineering; Sep./Oct. 2014; pp. 6-10.

(Continued)

*Primary Examiner* — Christopher M Brandt
(74) *Attorney, Agent, or Firm* — JCIPRNET

(57) ABSTRACT

A fence system can determine positions and orientations of objects. The fence system may include fence associated with a fence network that has a plurality of fence nodes. The locations of the fence nodes and fence are defined in a fence coordinate system. A tracked object has a plurality of transient nodes. The fence network may determine the position and orientation of the tracked object based on estimated distances between at least two of the plurality transient nodes and at least two of the plurality of fence nodes. The system may also include a second fence associated fenced object that also has a plurality of transient nodes.

16 Claims, 18 Drawing Sheets

(56) References Cited

U.S. PATENT DOCUMENTS

| | | | |
|---|---|---|---|
| 7,680,590 B2 | 3/2010 | Sanqunetti | |
| 9,301,094 B2* | 3/2016 | Jajoo | H04W 4/021 |
| 2013/0023283 A1* | 1/2013 | Chakravarty | G01S 5/0252 |
| | | | 455/456.1 |
| 2013/0180468 A1 | 7/2013 | Dutcher | |
| 2014/0015546 A1* | 1/2014 | Frederick | G01B 7/14 |
| | | | 324/642 |
| 2015/0281887 A1* | 10/2015 | Johnson | H04W 4/021 |
| | | | 455/456.3 |
| 2016/0142862 A1* | 5/2016 | Coenen | H04W 4/80 |
| | | | 455/41.1 |
| 2016/0165393 A1* | 6/2016 | Pang | H04W 4/021 |
| | | | 455/456.1 |

OTHER PUBLICATIONS

Institute of Electrical and Electronics Engineers, Inc.; IEEE Standard for Local and Metropolitan Networks—Part 15.4: Low-Rate Wireless Personal Area Networks (LR-WPANS); Sep. 5, 2011; pp. 1-294.

DecaWave, Ltd.; Overview of DWM1000 Module; 2013; pp. 1-2.

DecaWave, Ltd.; Overview of DW1000 ScenSor (Seek Control Execute Network Sense Obey Respond); 2013; pp. 1-2.

UC Berkley Electrical Engineering and Computer Science, "people.eecs.berkley.edu/~jrs/papers/meshbook/chapter2.pdf", Oct. 25, 2012, Chapter 2, pp. 31-41.

* cited by examiner

INTELLIGENT GEO-FENCING WITH TRACKED AND FENCED OBJECTS

CROSS-REFERENCE TO RELATED APPLICATIONS

This application claims the benefit of U.S. provisional application Ser. No. 62/189,152, filed Jul. 6, 2015, which is hereby incorporated by reference. This application is also a continuation-in-part of application Ser. No. 14/966,970, filed Dec. 11, 2015, which claims the benefit of U.S. provisional application Ser. No. 62/112,568, filed Feb. 5, 2015, and U.S. provisional application Ser. No. 62/090,578, filed Dec. 11, 2014, all of which are hereby incorporated by reference.

BACKGROUND

Field of the Invention

The present invention relates generally to fence networks and more particularly to methods of intelligently establishing and monitoring geo-fences.

Description of Related Art

A geo-fence is a virtual barrier that uses a global positioning system (GPS), radio frequency identification (RFID), or other location based identification to define boundaries. Programs that incorporate geo-fencing set up triggers so that when a device enters (or exits) the boundaries defined by the geo-fence, an alert is sent. The technology has many practical uses. For example, a retailer can create a geo-fence a retail store in a mall or shopping center and send a coupon to a customer who has downloaded a particular mobile app when the customer (and his smartphone) crosses the boundary. Electronic ankle bracelets have long been used with geo-fencing to alert authorities if an individual under house arrest leaves the premises. In order to establish the geo-fence, the nodes involved need to know the shape and boundaries of the fence.

SUMMARY

In one aspect, a method is provided for tracking an object having an associated shape. The method includes: detecting establishment of communications between at least one of a plurality of fence nodes associated with a fence network and at least one of a plurality transient nodes associated with a tracked object; estimating distances between at least two of the plurality transient nodes and at least two of the plurality of fence nodes; and determining a pose of the tracked object using the estimated distances, wherein the pose includes a position of the tracked object and an orientation of the of the tracked object.

In another aspect, a method is provided for tracking an object having an associated shape with respect to a fence associated with another object. The method includes: detecting establishment of communications between at least one of a plurality of fence nodes associated with a fence network and at least one of a plurality transient nodes associated with a tracked object; estimating distances between at least two of the plurality transient nodes associated with the tracked object and at least two of the plurality of fence nodes; determining a pose of the tracked object using the estimated distances, wherein the pose includes a position of the tracked object and an orientation of the of the tracked object, and wherein the pose of the tracked object is determined in a fence coordinate system associated with the fence network; detecting establishment of communications between at least one of the plurality of fence nodes and at least one of a plurality transient nodes associated with a fenced object; estimating distances between at least two of the plurality transient nodes associated with the fenced object and at least two of the plurality of fence nodes; determining a pose of the fenced object using the estimated distances, wherein the pose includes a position of the fenced object and an orientation of the of the fenced object, and wherein the pose of the fenced object is determined in the fence coordinate system associated with the fence network; and determining a disposition of the tracked object relative to a fence associated with the fenced object based on the determined pose of the pose of the tracked object and the determined pose of the fenced object.

In another aspect, a fence system is provided that includes: a fence network associated with a first fence in a fence coordinate system, the fence network having a first plurality of fence nodes having locations defined in the fence coordinate system; and a tracked object having a first plurality of transient nodes, wherein the fence system is configured to determine a pose of the tracked object using estimated distances between at least tow of the first plurality transient nodes and at least two of the plurality of fence nodes, the pose including a position and an orientation of the tracked object in the fence coordinate system.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
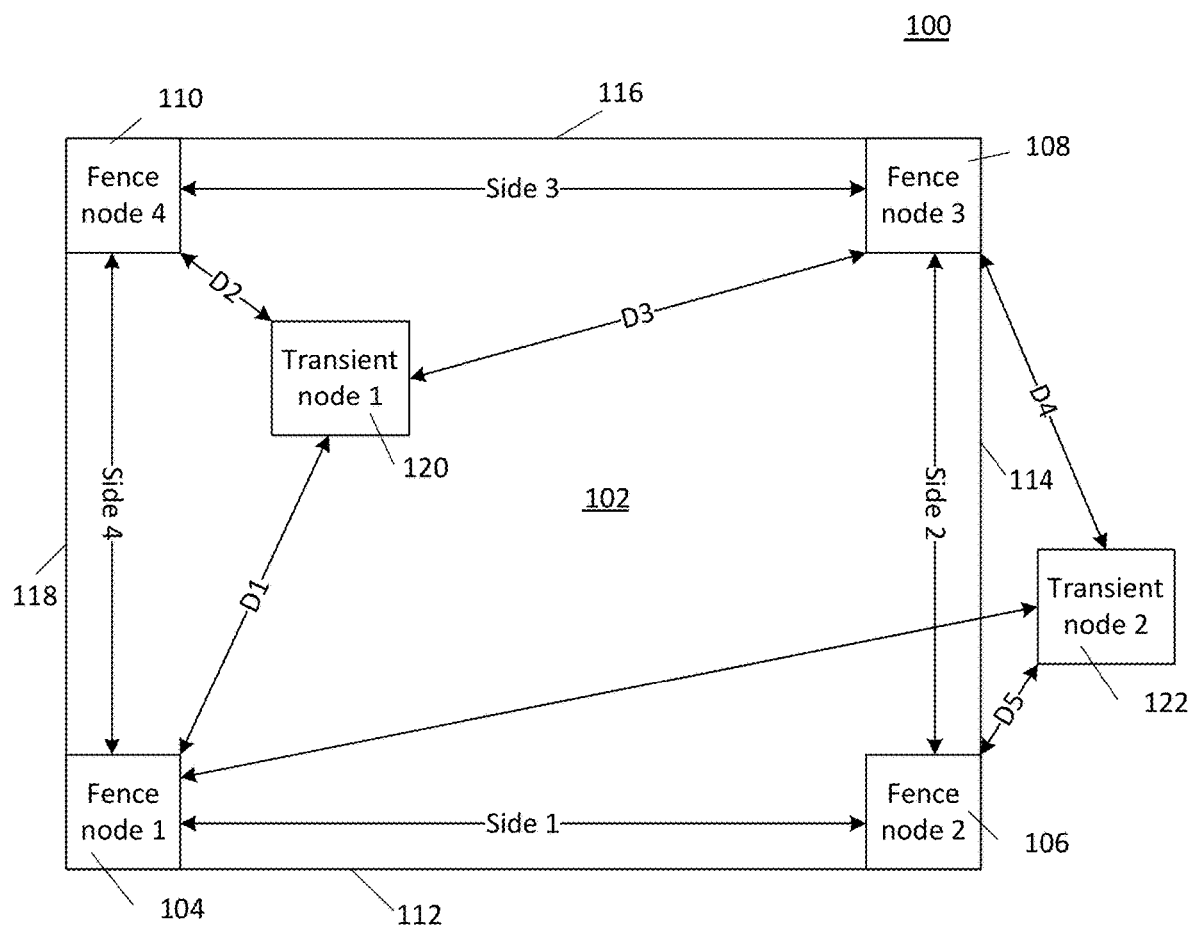
FIG. 1 is a schematic illustration of an example geo-fence system in accordance with aspects of the present disclosure.

Embodiments of the invention provide for a method, system, fence node and computer program product for intelligently establishing and monitoring geo-fences. FIG. 1 is a schematic illustration of an example geo-fence system 100 in accordance with one aspect of the present disclosure. The example system 100 contains a geo-fenced area 102 (also referenced herein simply as a "fence" or "geo-fence") defined by four nodes 104, 106, 108, 110 acting as fence nodes. The fence nodes 104, 106, 108, 110 are used in defining the boundary of the fence 102 having four sides 112, 114, 116, 118 and determining whether a transient node 120, 122 is inside or outside the fence 102 through trilateration. The four fence nodes 104, 106, 108, 110 define a geo-fence 102. One of the four fence nodes 104, 106, 108, 110 may act as the master fence node while the others act as slave fence nodes. A master fence node acts as the master of the fence nodes 104, 106, 108, 110 comprising a fence 102. All other fence nodes operate as slave nodes.

The communication network established between the nodes, for instance using communications such as ultra-wideband (UWB) is known as a "fence network."

The system 100 also contains two transient nodes 120, 122. Transient node 120 may be determined to be inside the fence 102 by determining distances D1, D2, and D3 and using trilateration methods known to one skilled in the art. Similarly, transient node 122 may be determined to be outside the fence by determining distances D4, D5, and D6.

Nodes 104, 106, 108, 110, 120, 122 consist of any device that can communicate on the fence network, including master fence nodes, slave fence nodes and transient nodes. Such devices may include cellular phones, smartphones, wireless routers, gateways, access points, servers, laptop computers, desktop computers, range extenders or any other electronic device equipped to communicate over a fence network.

Figure 2:
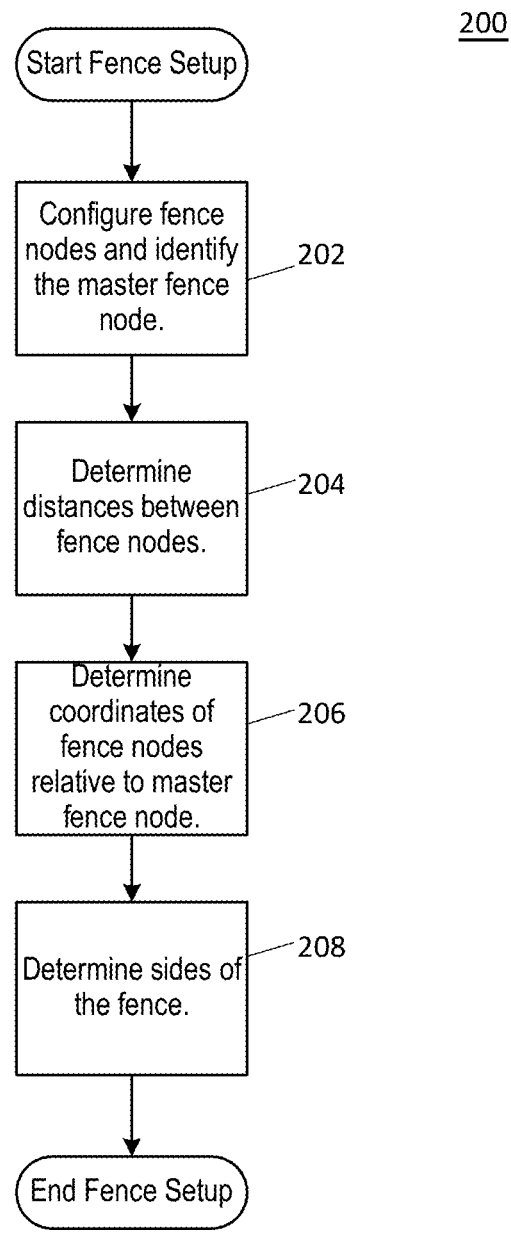
FIG. 2 is a flowchart illustrating an example process for creating a geo-fence in accordance with aspects of the present disclosure.

Referring now to FIG. 2, a flowchart 200 illustrating an example process for creating a geo-fence in accordance with one aspect of the present disclosure is provided. Beginning at step 202, the fence nodes 104, 106, 108, 110 are configured and the master fence node is identified. This configuration may include determining the number of nodes in the fence 102, assigning IDs to the fence nodes 104, 106, 108, 110, determining the channel characteristics of the fence network (e.g., frequency, bandwidth, preambles, codes, etc.), and identifying the master fence node. Configuration may take place by numerous means including, but not limited to, attaching the nodes to a computer for configuration via wired or wireless communications, setting switches on or in the fence nodes 104, 106, 108, 110, or a combination. Some attributes may be chosen by scanning for neighboring fence networks and avoiding similar configurations, such as channel, preambles, or codes used.

When determining the number of nodes of the fence 102, a number of methods may be used. In an embodiment, nodes may be configured with a fence ID and all nodes report their fence ID and listen for other nodes with the same fence ID, learning the number of nodes in the fence. In an alternate embodiment, the master fence node broadcasts a request for fence nodes configured with a particular fence ID to identify themselves. Fence nodes with the corresponding fence ID transmit a response including fence ID and node ID. The master fence node receives responses and counts the number of unique node IDs. Various collision mitigation methods may be used to eliminate or reduce the effect of simultaneous responses (e.g., Carrier sense multiple access with collision avoidance (CSMA/CA), multiple transmissions, etc.).

The fence ID also enables the fence nodes of neighboring fences to know which fence nodes are in their own fence and which are not. In an alternate embodiment, the fence node devices are programmed with the number of fence nodes. This programming may be, for instance, by setting switches on or in the fence node, connecting each fence node to a computer or other configuration device, or by configuring the master fence node which communicates the information to the slave fence nodes via the fence network.

Node IDs may be assigned to the fence nodes at configuration or the fence nodes may have node IDs preset at the factory. The node IDs allow the association of distances and positions with specific fence nodes. Similarly, the assignment of which fence node acts as the master fence node and which fence nodes act as the slave fence nodes may be performed as a configuration step or may be performed at the factory. For instance, a master node may be physically different than the slave fence nodes in ways such as wall power versus battery power or additional communications methods other than the fence network communications capability, such as Wi-Fi or Ethernet.

Figure 3:
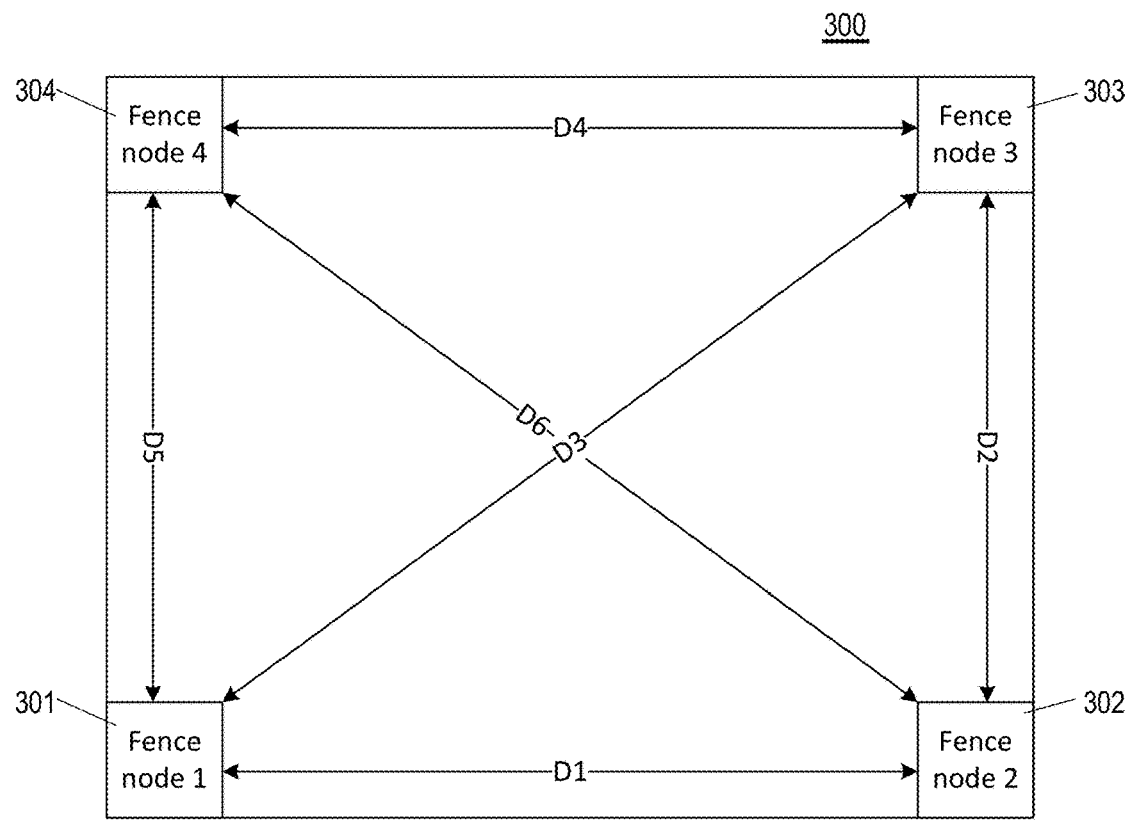
FIG. 3 is a pictorial illustration of an example rectangular room having a fence node defining the boundaries at each corner according to aspects of the present disclosure.

Once the fence nodes are configured and physically placed, the fence nodes determine, at step 204, the distances to the other fence nodes in the fence network. This determination may be done, for instance by measuring the round trip delay between a message and a response using the fence network communications capability. FIG. 3 gives an example for a rectangular room 300 with a fence node 301, 302, 303, 304 at each corner.

The distances, D1 to D6, between pairs of fence nodes are determined, for instance via measuring the round trip delay of a message and its response over wireless communications (e.g., the fence network) between the fence nodes 301, 302, 303, 304. The distances calculated by a fence node 301, 302, 303, 304 may be reported to other fence nodes 301, 302, 303, 304 via the fence network. With this information, the shape of the fence can be determined and an ordered list of the nodes in a coordinate system with master fence node 301

(or whichever node is master) can be created, enabling determination of the location of a transient node and whether the transient node is inside the fence.

Figure 4:
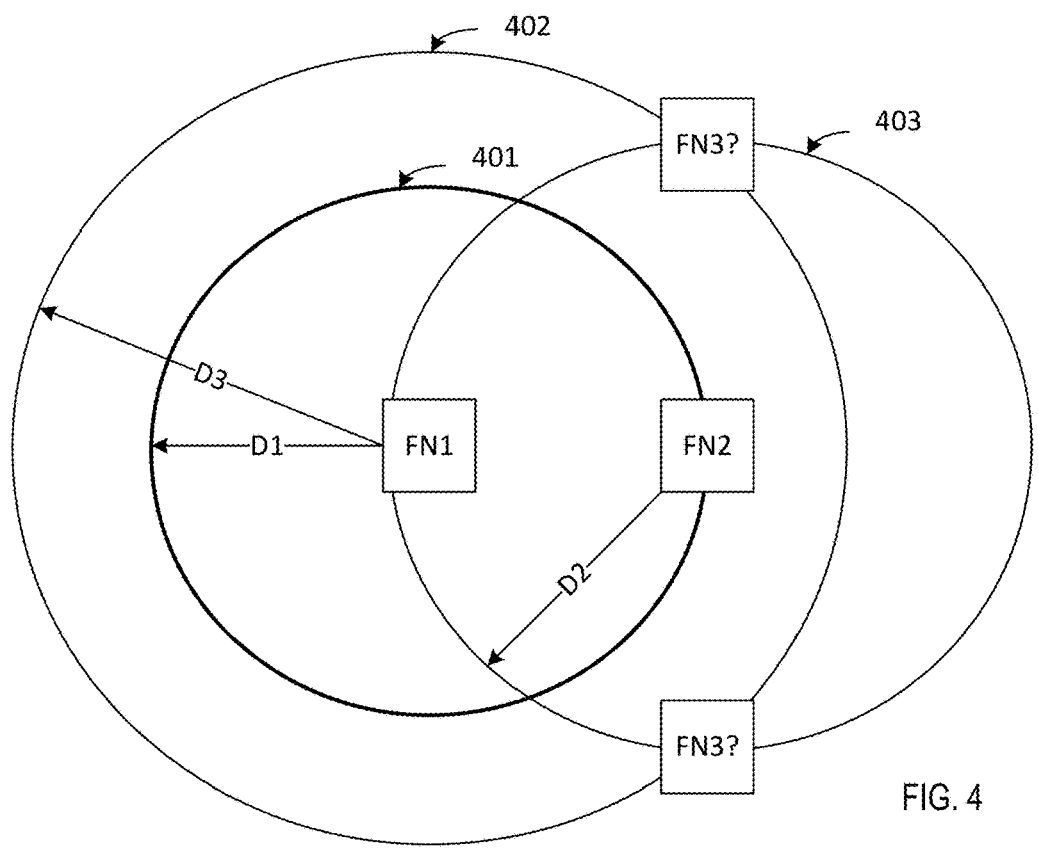
FIG. 4 is a pictorial illustration of an example process to start a determination of the sides of a geo-fence according to aspects of the present disclosure.

FIG. 4 visually illustrates the start of the determination of the sides a fence, and therefore the fence, by determining, at step 206, the coordinates of each fence node relative to the master fence node FN1. Master fence node FN1 and fence node FN2 determine, for instance, via messaging round trip delay, that they are at a distance D1 from each other. This determination means, from FN1's point of view, FN2 is somewhere on circle 401. Since the fence creation method is interested in relative positions, the line between FN1 and FN2 can arbitrarily be designated the x-axis of a Cartesian coordinate system with FN1 at (0,0). Fence node FN1 and fence node FN3 determine that they are at a distance D3 from each other, indicating that FN3 is somewhere on circle 402. Fence node FN2 and fence node FN3 determine that they are at a distance of D2 from each other, indicating that, from FN2's point of view, FN3 is on circle 403. Since FN3 is on both circle 402 and circle 403, FN3 can only be in one of two places where those two circles intersect. Since relative positions are desired and absolute positions are unnecessary, which of these two positions is selected does not matter as both positions form the same triangle, just viewed right side up or upside down with respect to each other. This triangle is sufficient to determine a 3-sided fence, for instance, by passing the distances to the master fence node FN1 to perform calculations. The position of further fence nodes can be determined relative to the coordinate system onto which these first three points are mapped.

Figure 5:
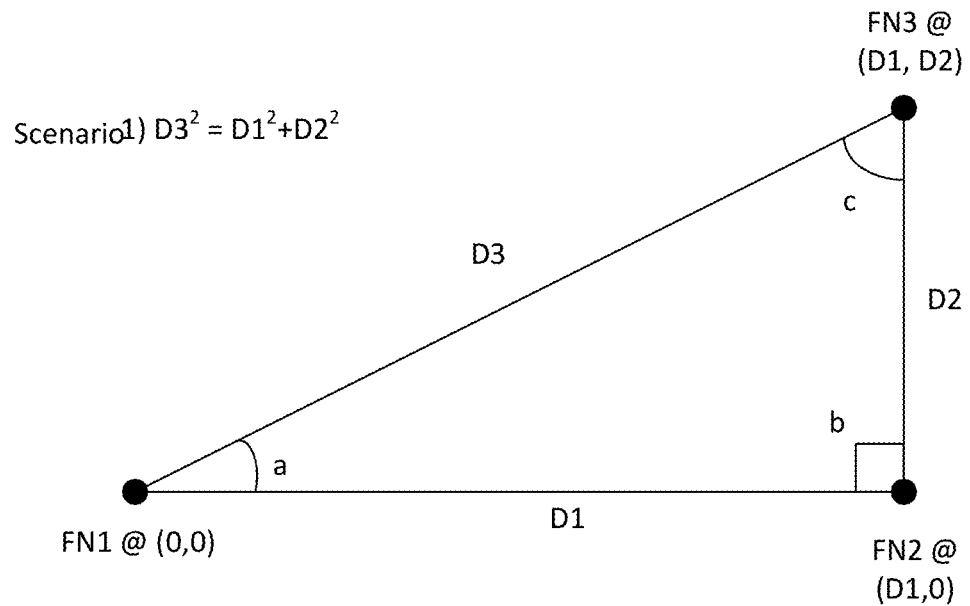
FIG. 5 is a pictorial illustration of two example scenarios for finding the coordinates of fence node FN3 of FIG. 3.
Figure 5:
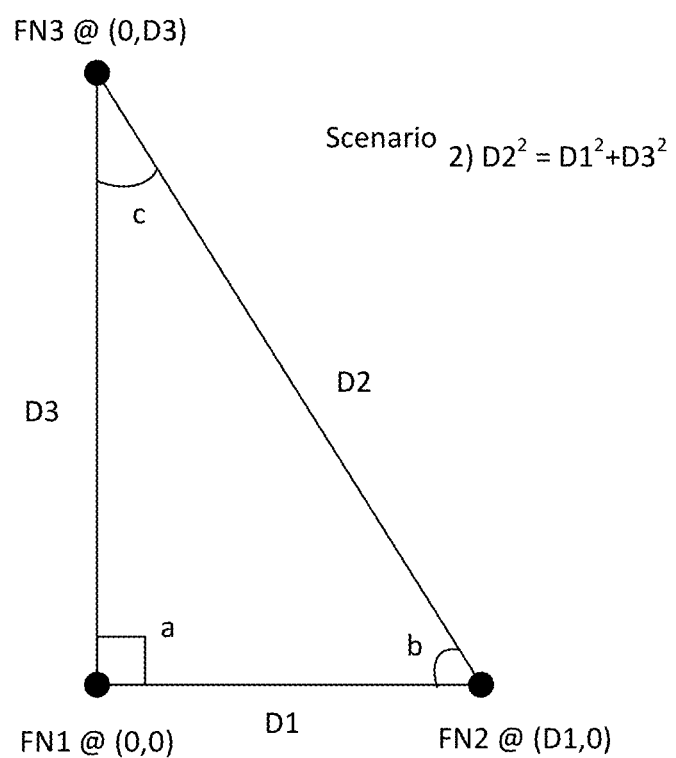
Figure 6:
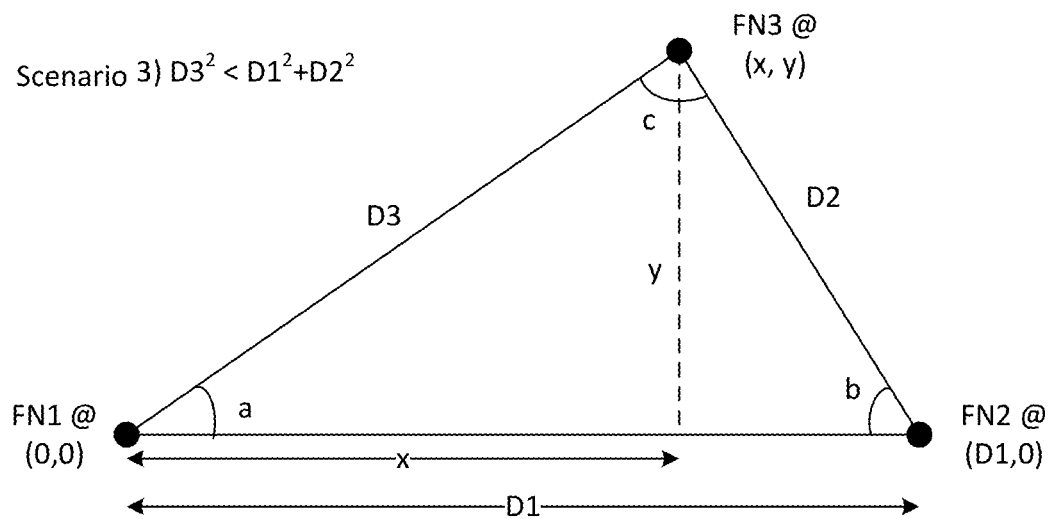
FIG. 6 is a pictorial illustration of two additional example scenarios for finding the coordinates of fence node FN3 of FIG. 3.
Figure 6:
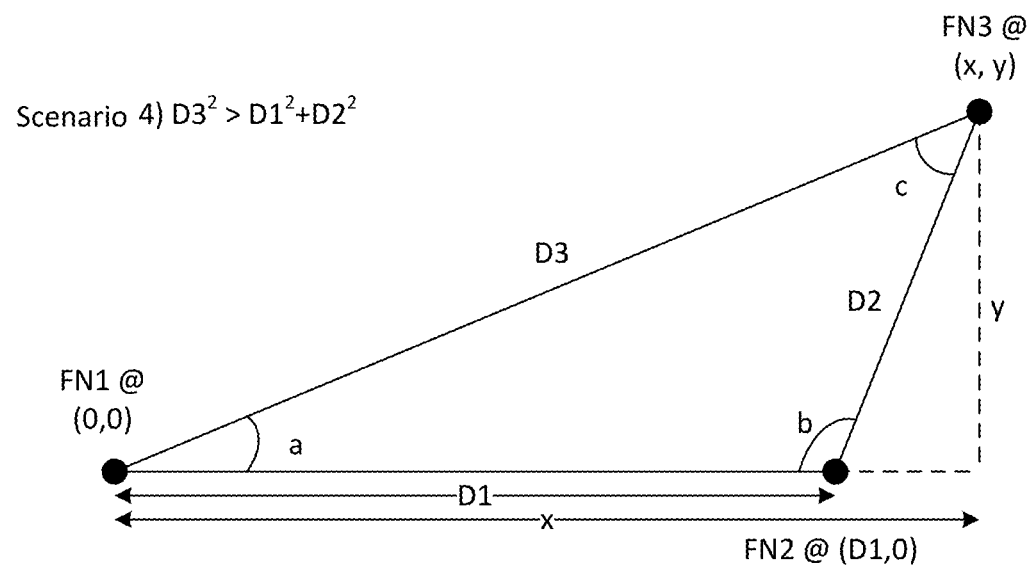

FIGS. 5 and 6 illustrate four scenarios for finding the coordinates of fence node FN3. Note that not all sides of the triangles used in the examples may become sides of the fence, for example, while distance D3 is the side of a triangle in the examples below, if the example is the rectangular room shown in FIG. 3, the pair (FN1, FN3) does not represent a side of the fence. The path from fence node FN1 to fence node FN2 is defined as being the x axis of the coordinate system with fence node FN1 at the origin. Which scenario is happening for a set of 3 distances is determined by the relationship between $D1^2$, $D2^2$, and $D3^2$ as shown in FIGS. 5 and 6. Once the scenario is identified, the relative position of the third node may be calculated. The result in the case of scenarios 1 and 2 is as shown in FIG. 5.

The calculations for scenario 3 and the calculations for scenario 4 are the same. The coordinates of fence node FN1 and fence node FN2 are given by definition and all other fence nodes are positioned relative to these two. First, in equation [1], some temporary variables are assigned for the lengths of the sides to better correspond to traditional trigonometric nomenclature for naming an angle and the side of a triangle opposite the angle as a lower case letter and the corresponding upper case letter.

$$A=D2, B=D3, C=D1 \quad [1]$$

From the laws of cosines, equations [2], [3], and [4] are obtained. If angle a is an obtuse angle, it may be more convenient to apply the laws of cosines from the point of view of angle b and side B.

$$A^2 = B^2 + C^2 - 2BC\cos a \quad [2]$$

$$2BC \cos a = B^2 - C^2 - A^2 \quad [3]$$

$$\cos a = \frac{B^2 - C^2 - A^2}{2BC} \quad [4]$$

From the definition of cosine, equations [5] and [6] are obtained.

$$\cos a = x/B \quad [5]$$

$$x = B \cos a \quad [6]$$

Substituting equation [4] into equation [6], equations [7] and [8] are obtained. Equation [8] gives the x-axis coordinate of fence node FN3.

$$x = \frac{B^2 + C^2 - A^2}{2C} \quad [7]$$

$$x = \frac{D3^2 + D1^2 - D2^2}{2D1} \quad [8]$$

From the Pythagorean Theorem, equations [9], [10], and [11] are obtained.

$$B^2 = y^2 - x^2 \quad [9]$$

$$y^2 = B^2 - x^2 \quad [10]$$

$$y = \sqrt{B^2 - x^2} \quad [11]$$

Substituting, in equation [12], the y-axis coordinate of fence node FN3 is obtained.

$$y = \sqrt{D3^2 - x^2} \quad [12]$$

A fourth fence node, and so on, can have its position determined relative to fence nodes FN1 and FN2 in a similar fashion. These determinations may be coordinated by the master fence node FN1 via the fence network.

There are other scenarios, such as where angle a is an obtuse angle (i.e., x is negative for fence node FN3 and $D2^2 > D1^2 + D3^2$). One skilled in the art would be able to apply the Laws of Cosines and other trigonometric formulas to these scenarios, as well.

Returning to flowchart 200, the sides of the fence are determined at step 208. For most room configurations, e.g., rectangular or at least convex, it is convenient to determine the ordering of the sides of the fence nodes by defining the first side as the side connecting the master fence node to the closest slave node. Alternatively, instead of beginning from the position of the master fence node, the process may begin at the position of any fence node designated by the master fence node or some other controlling entity. The next side may be the side connecting that slave fence node to the not yet connected slave fence node closest to the first slave node, and so on. When no unconnected nodes remain, the fence is closed by connecting to the master fence node.

Figure 7:
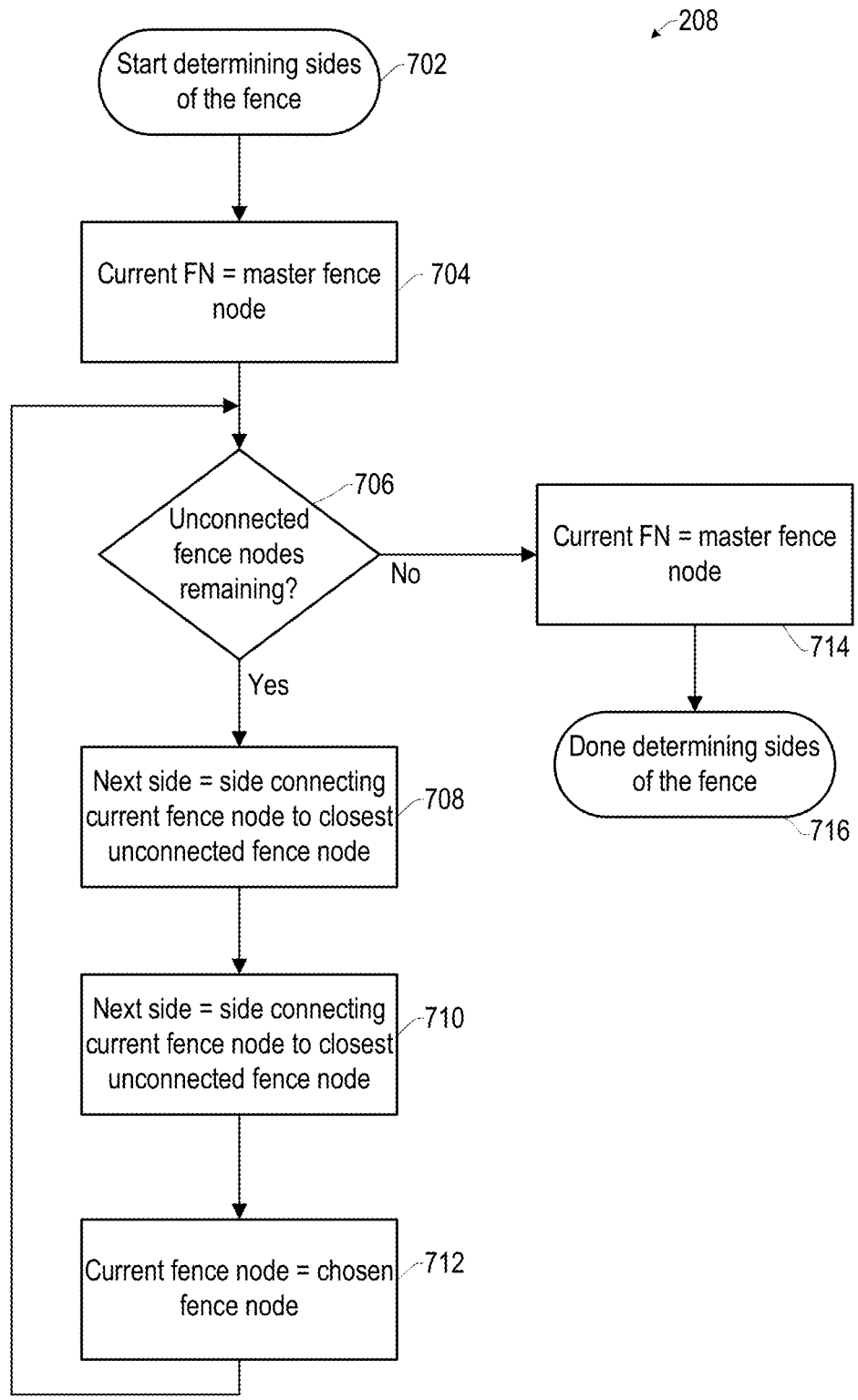
FIG. 7 is an example flowchart illustrating an expansion of the block "determine sides of the fence" from FIG. 2 in accordance with aspects of the present disclosure.

FIG. 7 is a flowchart illustrating an expansion of step 208. The process starts determining the ordering of the sides of the fence nodes, at step 702, by setting the current fence node as the master fence node, at step 704. If there are unconnected fence nodes remaining, at step 706, the unconnected fence node closest to the current fence node is determined, at step 708. The next side of the fence is defined, at step 710, as the side connecting the current fence node to the closest unconnected fence node. At step 712, the closest unconnected fence node, as determined at step 708, is set to be the current fence node and the process returns to decision block 706 to determine whether there are any unconnected fence nodes remaining. When no unconnected fence nodes remain, at step 705, the last side of the fence is determined to be the side connecting the current fence node to the master fence node, at step 714, and the process ends at step 716. For the room in the example of FIG. 3, since 301 is the master fence node and 304 is the closest slave fence node, the fence sides could be identified as (301, 304), (304, 303), (303, 302), and (302, 301).

Note that to save resources in a deployment with multiple fences, a fence node may be a member of two fences simultaneously, for instance, if the fence node is on the wall between two rooms. One skilled in the art would understand how such a node could be configured to participate in two fences using the same or different communications capabilities for the fence network of each fence.

Figure 8:
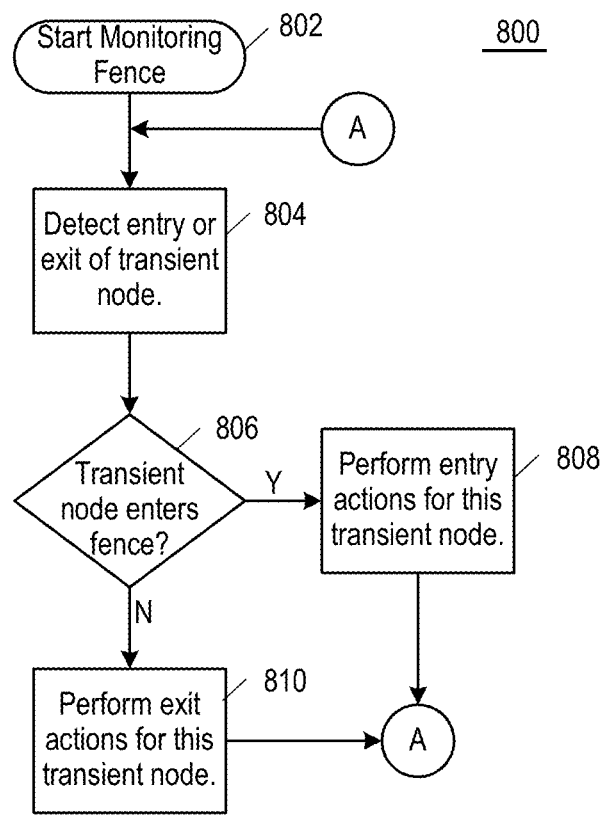
FIG. 8 is a flowchart illustrating an example process of monitoring for and acting upon a transient node entering or exiting the geo-fenced area according to aspects of the present disclosure.

Turning now to FIG. 8, a flowchart 800 illustrating an example process of monitoring for and acting upon a transient node, possibly associated with another device, entering or exiting the fence is shown. The fence network begins monitoring the fence at step 802. When a transient node with capability to communicate with the fence network is within communications range of the fence, some or all of the fence nodes of the fence may be able to detect, at step 804, entry or exit of the transient node by determining a distance to the transient node in a fashion similar to that used in establishing the fence. If at least 3 fence nodes can determine their distance from the transient node, the position of the transient node can be determined, for example via trilateration.

Once the geo-fence is defined and the location of the transient node is determined, there are known algorithms for determining whether a point (i.e., a transient node) is inside the fence or outside the fence. Monitoring may be continuous or periodic, allowing changes in transient node position to be determined. When it is detected that a transient node has entered the fence, at step 806, entry actions are taken, at step 808. Example actions include enabling certain functionality of a device associated with the transient node or another device, joining a specific communications network other than the fence network, and so on. Additionally, special areas, or sub-fences, within a fence may be identified. Different actions may be taken when a transient node enters or exits a sub-fence. One skilled in the art would understand that sub-fences do not require additional fence nodes as a transient node at any point in the sub-fence may be located via trilateration by 3 or more fence nodes of the main fence.

The actions taken may apply to all transient nodes that enter the fence or may be specific to a class of transient nodes or an individual transient node. The actions and any necessary parameters may be configured in a fence node (for instance, the master fence node) or retrieved by a capable fence node (for instance, from a serving computer over Wi-Fi or Ethernet). The actions and parameters may be communicated to the transient node or other devices via the fence network. Some actions and parameters may be stored in the transient node, which may receive a command via the fence network to take the actions.

When a transient node has exited the fence, but is still within communications range of the fence network, at step 806, exit actions may be performed, at step 810. These actions may include, but are not limited to, actions opposite the entry actions, for instance, disabling certain functionality of the device associated with the transient node or another device, leaving a specific communications network other than the fence network, and so on.

Figure 9:
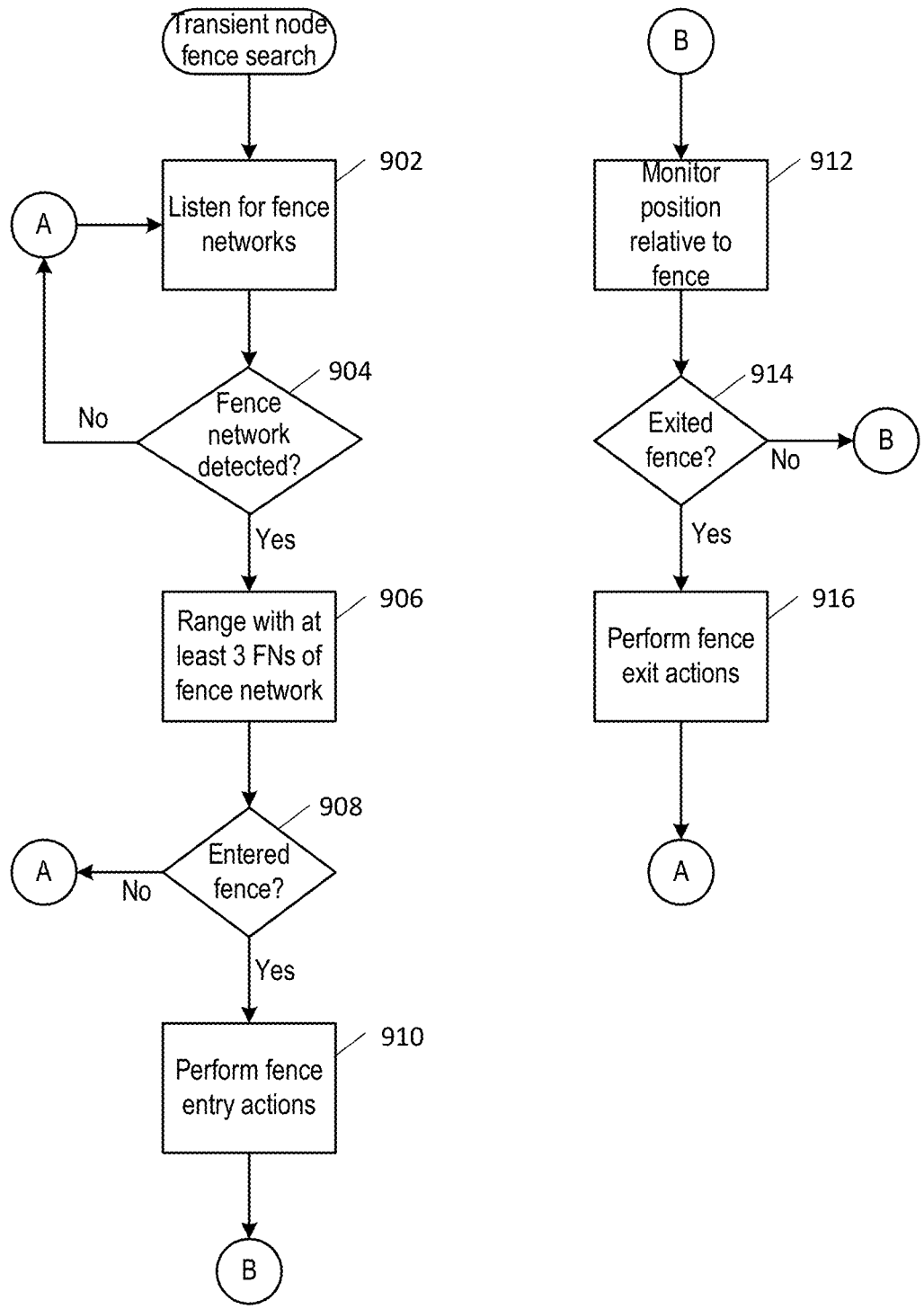
FIG. 9 is an example flowchart illustrating the basic operation of a transient node in accordance with aspects of the present disclosure.

FIG. 9 shows a flowchart 900 illustrating the basic operation of a transient node, such as transient nodes 120, 122. The transient node starts, at step 902, by listening for fence networks. When a fence network is detected, at step 904, and the transient node is within communication range of at least 3 fence nodes of the fence network, at step 906, the location of the transient node relative to the fence may be determined via trilateration. In an embodiment, the master fence node may initiate and direct ranging, collecting the range information and determining whether the transient node is inside the fence. It should be noted that the term "ranging" may include accommodating a round-trip delay as well as any other procedure used for distance estimation. In another embodiment, another node, such as the transient node, initiates ranging, at step 906. If the transient node has not entered the fence, at step 908, the transient node continues to listen for fence networks, at step 902, periodically ranging to determine whether the transient node has entered a fence. If the transient node has entered the fence, at step 908, the transient node performs any actions associated with entering that fence, at step 910, possibly taking direction and configuration from one of the fence nodes via the fence network. While the transient node is within the fence, the transient node continues to monitor its own position, at step 912, by ranging with at least three fence nodes of the fence. In an alternate embodiment, the master fence node monitors the position of the transient node by directing it to range with at least three fence nodes of the fence. This ranging may be periodic, or may be stimulated by an event such as an accelerometer or other motion detection capability signaling that the transient node has moved. Such a capability may also be used to determine when to check for fences while not within a fence. If the transient node determines it has exited the fence, at step 914, the transient node performs fence exit actions, at step 916, possibly taking direction and configuration from one of the fence nodes via the fence network.

Figure 10:
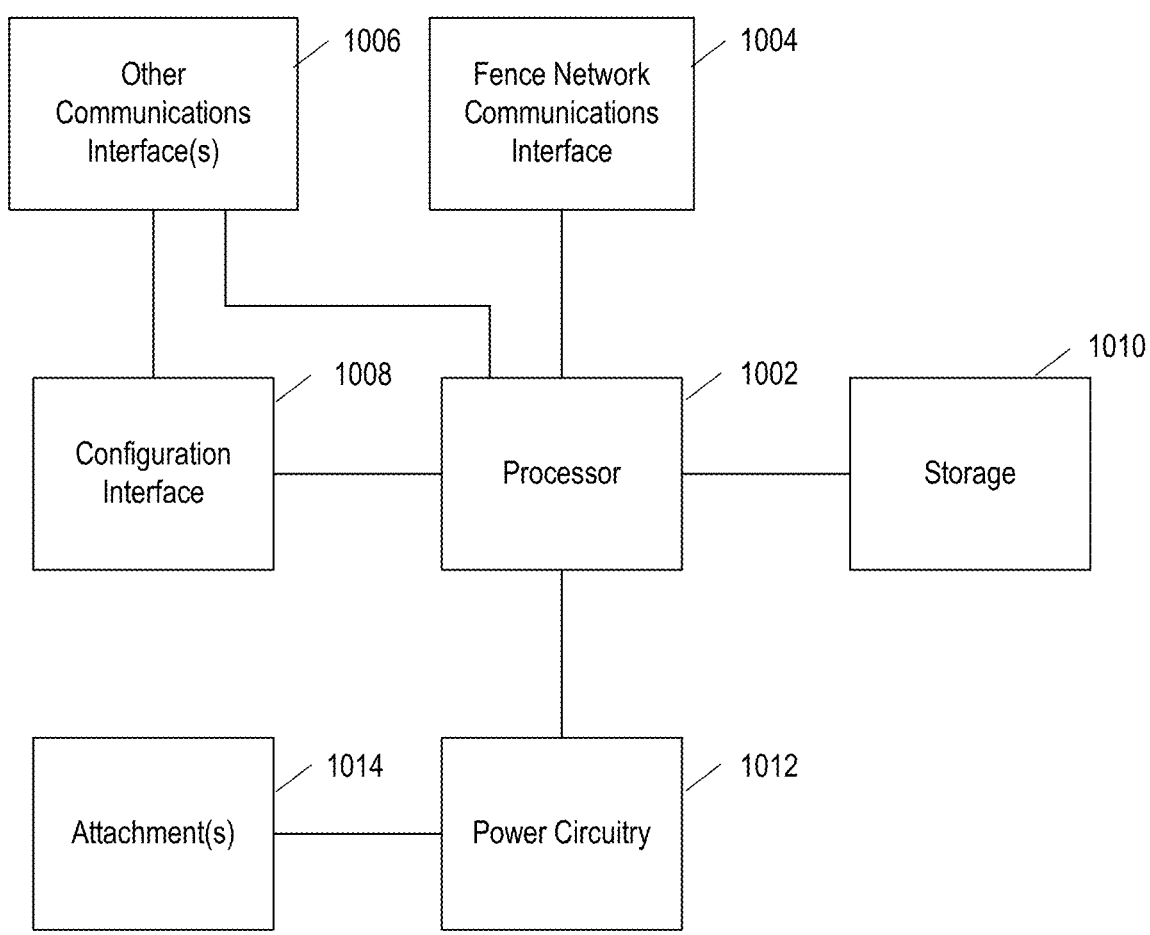
FIG. 10 is a schematic illustration of an example node in accordance with aspects of the present disclosure.

Referring now to FIG. 10, a block diagram of an example node 1000 is provided. Example node 1000 may comprise such as nodes 104, 106, 108, 110, 120 or 122 of FIG. 1. The processor 1002 processes communications received and transmitted by the node. The processor 1002 can also process inputs from and outputs to the fence network communications interface 1004, the configuration interface 1006 and other communications interface(s) 1008. The storage 1010 may store data for use by the processor 1002, including distances between nodes. The storage 1010 may also be used to store computer readable instructions for execution by the processor 1002. The computer readable instructions can be used by the node for accomplishing the various functions of the node. In an example embodiment, the storage 1010 or parts of the storage 1010 may be considered a non-transitory machine readable medium.

The fence network communications interface 1004 provides the capability for nodes to communicate with each other over the fence network. The fence network communications interface 1004 uses technology suitable for determining distance via round trip messaging timing, such as specified in IEEE 802.15.4-2011. The fence network communications interface 1004 performs distance determinations between fence nodes to define the fence and between fence nodes and a transient node to determine the location of the transient node, for example, using trilateration. The fence network communications interface 1004 may be used to communicate information associated with configuration of the fence, a fence node, or a transient node. The fence network communications interface 1004 may be used to convey actions and parameters of actions to transient nodes when entering, exiting, or movement within the fence triggers an action. The fence nodes and transient nodes of a system have compatible fence network communications interfaces 1004.

The configuration interface 1006 provides the logic and any physical capabilities required to configure a node. For instance, configuration interface 1006 may include logic that allows the node to be configured over the fence network via the fence network communications interface 1004. The configuration interface 1006 may include pins and jumpers, toggles, switches, a SIM card, factory installed parameters in memory, or other hardware means of configuration. The configuration interface 1006 may include a communications mechanism other than the fence network communications interface 1004, for instance, USB, Ethernet, Wi-Fi, or the like or may be connected to another communications interface 1008 that may support configuration, and may also provide capabilities to provide node specific actions, such as a transient node establishing communications with another device over a Wi-Fi network that is not the fence network. The configuration interface 1006 may include a user interface such as a display and one or more entry devices such as a keyboard and mouse.

The power circuitry 1012 provides power to the node. The power circuitry 1012 may supply power via an external source such as wall power (e.g., 110V or low voltage as is commonly used in home thermostats), universal serial bus (USB), power over Ethernet (i), or such means as is known to one skilled in the art. The power circuitry 1012 may provide battery backup, optionally with recharging, in the event of loss of power. The power circuitry 1012 may provide solely battery power, either with disposable batteries or a capability to temporarily connect to an external power source to recharge the battery. For transient nodes which may be associated with another device, the power circuitry 1012 may also interface to the other device's power system in order to provide power to the transient node.

For concise explanation, the node or aspects of the node are described as having certain functionality. It will be appreciated that in some aspects, this functionality is accomplished by the processor 1002 in conjunction with the storage 1010, the configuration interface 1006, the fence network communications interface 1004 and other communications interface(s) 1008. Furthermore, in addition to executing instructions, the processor 1002 may include specific purpose hardware to accomplish some functions.

The node may also contain one or more attachments 1014. The attachment(s) 1014 may have numerous embodiments depending upon the type of node 1000 and its implementation. A simple attachment 1014 for a slave fence node may, for instance, comprise mounting hardware for mounting the slave fence node on a physical wall. A more complex attachment 1014 for a transient node may include connectors, wires, or other hardware to optionally interface between the power circuitry 1012 and a device to which the transient node is connected.

One skilled in the art would understand how these options could be applied to master fence nodes, slave fence nodes, and transient nodes and that different options may be used by each.

Alternative methods for determining a fence will now be described for which the vertices of a fence are not necessarily located at the fence nodes. For purposes of describing these example alternative methods, the following assumptions are made:

1. All fence nodes are placed in a horizontal plane or a plane that is almost horizontal.
2. A transient node or location marker is not necessarily in the same plane as the fence nodes.
3. The height of a transient node or location marker is not relevant for determining whether the transient or location marker is inside or outside the fence as long as the transient or location marker is within range of at least 3 fence nodes.
4. For trilateration purposes, a three-dimensional coordinate system is assumed, where the z-coordinate of each fence node is zero (i.e., z=0). The z-axis is orthogonal to the plane determined by the fence nodes. The direction of the z-axis, i.e., whether it is pointing upward or downward, is not essential. Once the coordinates of a transient node or location marker have been determined, the z-coordinate may be ignored or set to zero.

Figure 11:
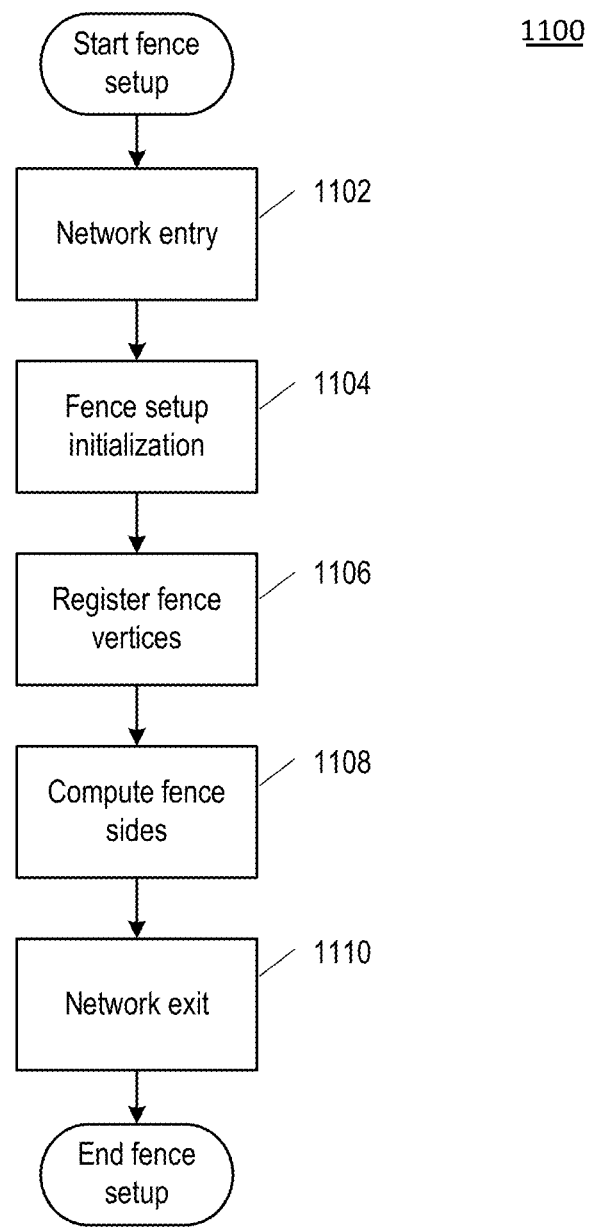
FIG. 11 is a flowchart illustrating an alternate example process for defining a geo-fence in accordance with aspects of the present disclosure.

As described above, with respect to the method described in FIG. 2, it is assumed that a fence network has been set up, a coordinate system has been defined relative to the fence network, and the coordinates of the fence nodes have been determined according to the process of FIG. 2. However, contrary to the above method, an embodiment described with reference to flowchart 1100 of FIG. 11 is of a fence that is not necessarily defined by the placement of the fence nodes. That is to say, the paths between the fence nodes are not necessarily the sides of the fence, and a different method than described above, with respect to FIG. 2, will be described that allows for more complex shapes, fewer fence nodes than fence vertices, and more easily defined subfences.

A summary of a possible method for defining a fence is as follows: A location marker is used for determining the position of the fence vertices. In sequence, a user places the location marker at the desired location of each fence vertex, and, while the location marker is at the vertex position, the distance between the location marker and three or more fence nodes are measured. Using these distance measurements and the known coordinates of the fence nodes, the coordinates of the vertex are computed using trilateration. After all the vertex positions have been registered, the sides of the fence are computed.

Referring now to FIG. 11, beginning at step 1102, a location marker and a fence network may perform network entry procedures unless this procedure has already been performed. A location marker is a node that is not a fence node, but may communicate with the fence nodes and may be used for setting up a fence. These network entry procedures may follow standard protocols such as those defined by IEEE Std. 802.15.4, Wi-Fi, or ZigBee. The network entry procedures may comprise mutual authentication of the fence network and the location marker as well as authorization of the location marker to enter the fence network. Authentication and authorization are not essential steps for defining a fence, but may provide protection against malicious or involuntary fence setup or destruction. During network entry, the location marker may be assigned a Node ID used in subsequent communications on the fence network. Network entry procedures may be coordinated by the master fence node or may be distributed among the fence nodes.

Once the location marker is on the fence network, the location marker may initiate fence setup, at step 1104. The fence setup initiation may be triggered by a user through a user interface, or it may, alternatively, be triggered by the completion of the network entry procedures. During fence setup initialization, a message exchange may take place between the fence network and the location marker. During this message exchange, a fence ID may be allocated by the fence network, fence nodes may be prepared for ranging with the location marker, the location marker may be provided with sufficient information to initiate the ranging with each of (a subset of) the fence nodes as well as the coordinates of each of those fence nodes, etc.

When the fence initialization has been completed, the user may be informed that the location marker is ready to register a first fence vertex, at step 1106. For example, the readiness may be indicated by a light emitting diode (LED) lighting up, a sound, or a message on a screen. The registration of a fence vertex is detailed by flowchart 1500 and described in more detail later in reference to FIG. 15. After the registration of a fence vertex has been completed, the location marker may indicate to the user that a next vertex is ready to be registered. This process is repeated until all vertices have been registered. The user may indicate, e.g., by depressing a button or through a graphical user interface (GUI), that all fence vertices have been registered.

The sides of the fence may be computed using one of several possible methods described below. A system may implement one or several of these methods and, if several methods are implemented, allow the user to choose, by means of a user interface, which method to use.

One method is to use the order in which the vertices were registered to determine the sides of the fence. This method, which assumes that the fence is a closed polygon, consists in joining consecutive vertices by straight line segments. The first and last vertices are also joined by a straight line segment. This method requires the user to register the vertices in the correct order. For example, to fence in a room, the user could follow the walls of the room in one direction (clockwise or counter-clockwise) and register a vertex in each corner. This method allows the fence to be of any arbitrary shape.

An alternative method for computing the sides of a fence does not require the vertices to be registered in any particular order. This method is based on the assumption that the fence does not contain acute angles and is illustrated in FIG. 12.

Figure 12:
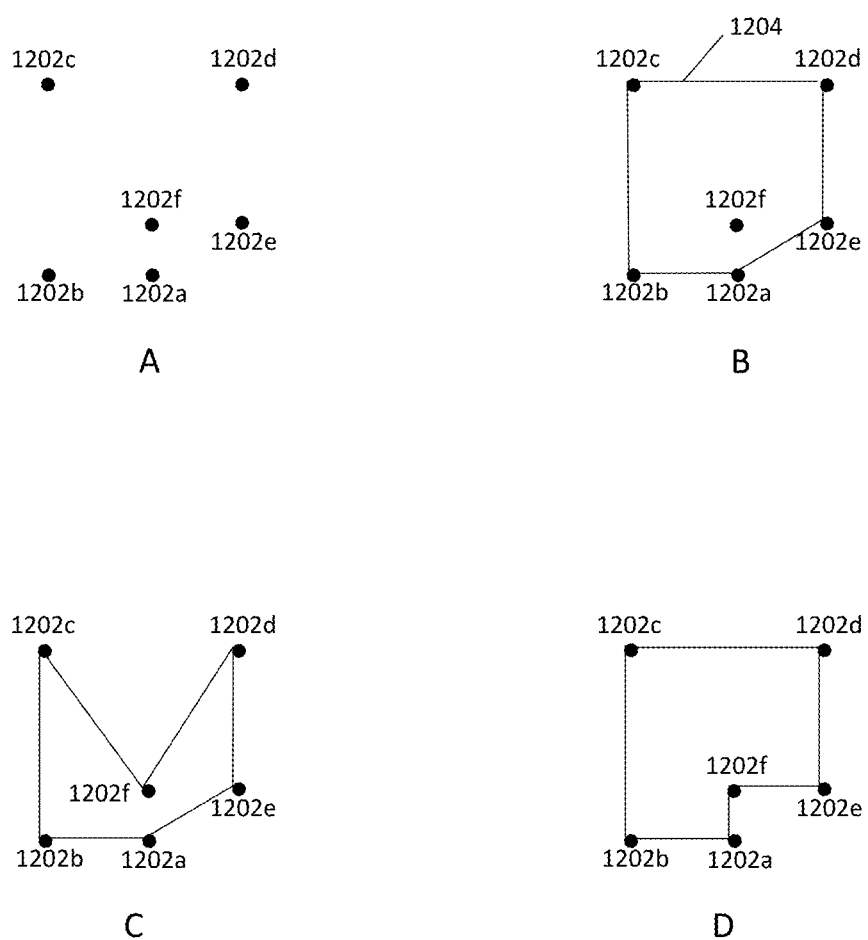
FIG. 12 is a pictorial illustration depicting an alternative process for computing the sides of a geo-fence in which the vertices are not required to be registered in a particular order according to aspects of the present disclosure.

Scenario A in FIG. 12 shows an example of registered vertices 1202*a*, 1202*b*, 1202*c*, 1202*d*, 1202*e*, 1202*f* (referenced collectively as vertices 1202) of a fence. The fence may be determined by joining these vertices 1202 with straight lines segments that do not intersect. There are multiple possibilities depending on in which order the vertices 1202 are joined, as illustrated by scenarios C and D. To determine a likely ordering of the vertices 1202, the method may first compute the convex hull 1204 of the vertices 1202. Methods for computing the convex hull of a finite set of points are well-known. The convex hull 1204 is illustrated by scenario B. If there are no vertices inside the convex hull 1204, then the fence is fully determined. However, if, as in the example of FIG. 12, there are interior vertices 1202*f*, the method may check each possible ordering consistent with the ordering of the non-interior vertices 1202*a*-1202*e* as determined by the convex hull 1204, and select the ordering that does not yield acute angles. For instance, placing the interior vertex (i.e., vertex 1202*f*) in FIG. 12 between the two top vertices (i.e., vertices 1202*d* and 1202*e*) yields acute angles, as shown by scenario C, as opposed to placing the interior vertex 1202*f* between the two bottom-right vertices (i.e., vertices 1202*a* and 1202*b*), as shown by scenario D. The same method may also be applied when more than one vertex is inside the convex hull. This method may be accommodated to allow for angles that are acute yet very close to being right (i.e., 90 degrees). For example, the method may choose the ordering of the vertices whose minimum acute angle is greatest. Alternatively, the method may ignore acute angles greater than a threshold, e.g., 80 degrees. The location marker may include a graphical user interface which may show the horizontal or other projections of the fence and allow the user to make corrections if necessary. As an alternative to the method disclosed for step 208, this method also applies to the case in which the fence vertices do not all coincide with the fence nodes.

Returning to FIG. 11, the computation of the sides of the fence, at step 1108, may start before all fence vertices have been registered or after all fence vertices have been registered. In an example embodiment, the computation of the fence sides may be performed by the location marker and communicated to other nodes. The nodes to which the fence definition is communicated depends on the roles of those nodes in monitoring a transient node, as described above. A person skilled in the art will appreciate that there are various ways the processes required for computing the fence sides may be deployed. A person skilled in the art will also appreciate that the fence sides provide one of several possible representations of a fence that allow for determining whether a transient node is inside or outside the fence, or whether it is entering or exiting the fence.

Figure 13:
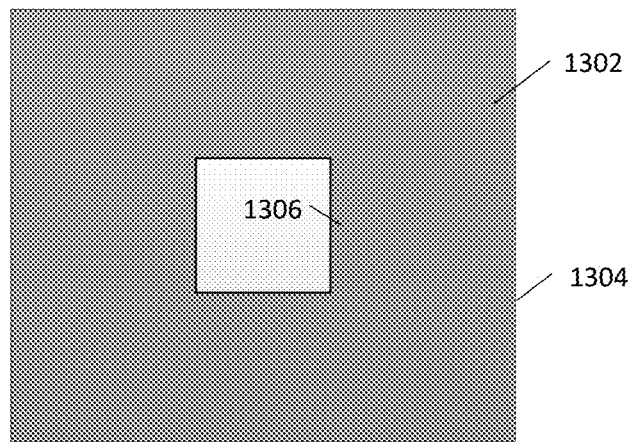
FIG. 13 is a pictorial illustration of an example fence enclosing an area in accordance with aspects of the present disclosure.

After a fence has been defined the location marker may exit the network, at step 1110. Alternatively, the user may be given, through a user interface, the option to define another fence. Several fences may be combined into a single fence using Constructive Area Geometry (CAG). For example, a fence enclosing the shaded area 1302 in FIG. 13, which could be the area within a workshop with the exclusion of an area surrounding the work bench, may be defined by first defining a fence enclosing the outer rectangle 1304, thereafter defining a fence enclosing the inner square 1306, and finally defining a fence 1302 as the boundary of the area of the outer rectangle less the area of the inner square. Note that such a fence may be regarded as a special case of two fences where the entry actions associated with the inner fence are the same as the exit actions of the outer fence, and vice versa, the exit actions of the inner fence are the same as the entry actions of the outer fence. Alternative to defining one fence, two fences may be defined with independent entry and exit actions associated with each.

Figure 14:
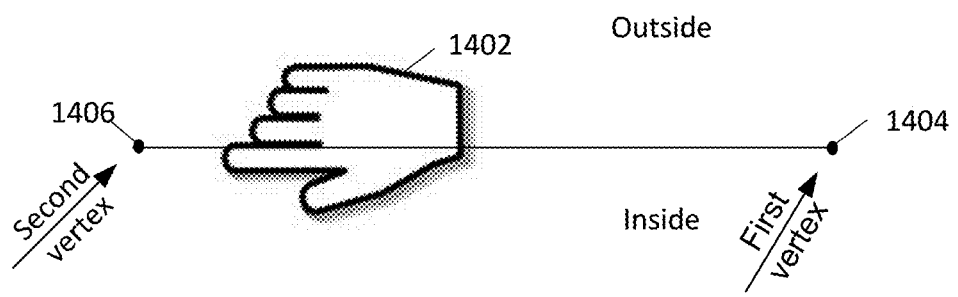
FIG. 14 is a pictorial illustration depicting a "right-hand rule" for determining the side of the fence that is inside the geo-fenced area according to aspects of the present disclosure.

The methods for defining a fence described so far assume that the fence is a closed polygon. This may not always be the case. For instance, a fence may be defined across a doorway to trigger, e.g., an alarm, if a transient node exits a room. Such a fence may be defined by registering two vertices. The fence, in this case, is delimited by a line. The side of the fence that is the inside may be defined using a "right hand rule," as shown in FIG. 14. By placing a right hand 1402 in the direction from the first vertex 1404 to the second vertex 1406, the inside of the fence is the side of the thumb. A user interface may allow a user to select the type of fence to be setup.

Figure 15:
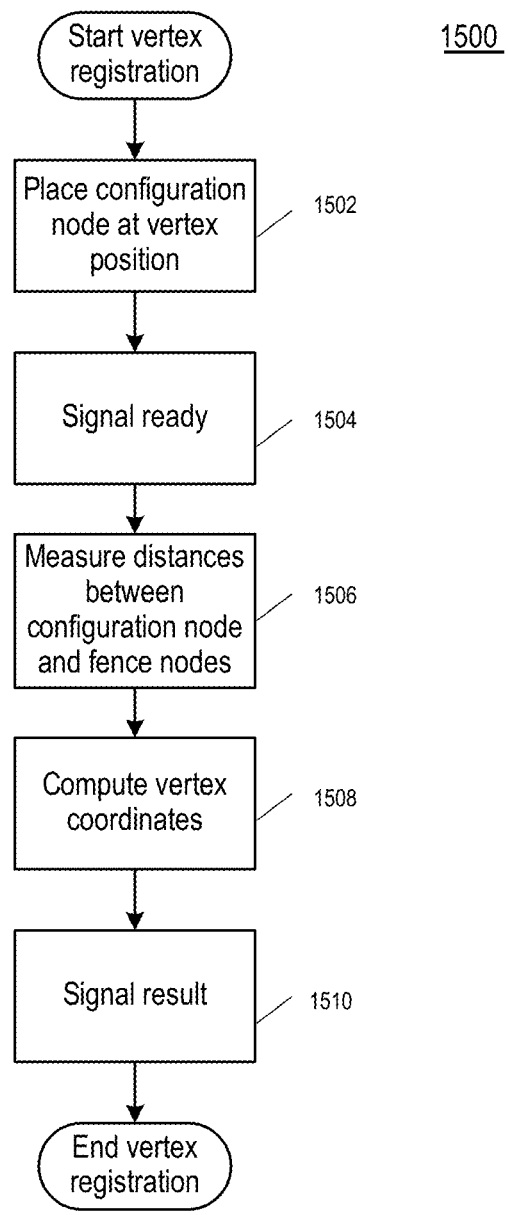
FIG. 15 is a flowchart illustrating an example process for registering vertices of a geo-fence in accordance with aspects of the present disclosure.

Turning now to FIG. 15, one example method of registering vertices is shown by flowchart 1500. The vertex registration may start, at step 1502, with the user placing the location marker at the desired vertex position. For example, the user may place the location marker in the corner of a room, a desk, a table, etc. When ready, at step 1504, the user may push a button to signal to the location marker that distance measurements may start. The distance between the fence node and the location marker may be measured, at step 1506, in the same way as the distance between a fence node and a transient node, as described in above in reference to FIG. 2. When the distances between the location marker and at least three fence nodes have been measured, the coordinates of the location marker may be computed, at step 1508, through trilateration, and the result is returned, at step 1510.

Trilateration consists of determining the coordinates of a point given the distances of the point to three non-collinear points for which the coordinates are known. Methods of trilateration, including both 2-dimensional and 3-dimensional trilateration, are well-known to those skilled in the art.

The same methods described above in relation to FIGS. 8 and 9 for determining the coordinates of a transient node may be applied for determining the coordinates of the location marker. Likewise, the description of a node provided in FIG. 10 may also be applied to the location marker. As for any of the nodes, the location marker may have a configuration interface 1006 which may include a user interface. In particular, the location marker may have an interface that allows the user to indicate when a new fence vertex is to be registered, such as a push button, a keyboard or a button on a graphical user interface. The user interface may include a speaker, LEDs, liquid crystal display (LCD) screen, or other, to provide feedback to the user when a fence vertex has been registered. A user interface may also be used by the user to indicate when a fence setup has been competed, or to make changes and adjustments to defined fences, including combining fences into one fence using CAG. The user interface may be partly or fully implemented on another device that communicates with the location marker through an other communications interface 1008 or fence network communications interface 1004. For example, a computer (e.g., a laptop, tablet or smart phone) may run a program that provides a graphical user interface used to interact with the location marker. In an embodiment, the location marker and the transient node may be combined into one device.

In referring to FIG. 11, an assumption was stated whereby all the fence nodes are on a same horizontal plane. This assumption may be removed if the following changes to the previous descriptions are made.

To determine the vertical direction, the location marker may be used to register two points on a vertical line. For instance, a user may, through a user interface, indicate that the registration of a vertical line is to start, and then register two points that are vertically aligned. The user may, for instance, use a corner of a room two ensure that the two points are on the same vertical line. The coordinates of the points on the vertical lines may be determined through trilateration.

If trilateration is based on only three fence nodes, then the equations used in determining the coordinates of each of the registered points may yield two solutions. The two solutions are on a line that is orthogonal to the plane through the three fence nodes, and, since that plane is not necessarily horizontal, that line is not necessarily vertical, and the projection of the two solutions on a horizontal plane may be distinct. However, sometimes one may assume that the location marker and transient nodes can only be on one side of the plane defined by the three fence nodes. For example, the fence nodes may be placed above a suspended ceiling or against an outer wall. This allows for disambiguation of the two solutions obtained through trilateration.

Another method for disambiguating the two solutions obtained through trilateration is to measure the distance to the location marker from a fourth fence node that is not on the same plane as the three other fence nodes. Measuring the distances between the location markers and four or more fence nodes also allows for more precise position estimates.

Once the vertical direction has been established, well-known methods exist for computing the horizontal projection of a point. Hence, the methods used for defining a fence may be applied. Likewise, the methods for monitoring and localizing a location marker described above may also be applied to a transient node.

Tracked and Fenced Objects

Figure 16:
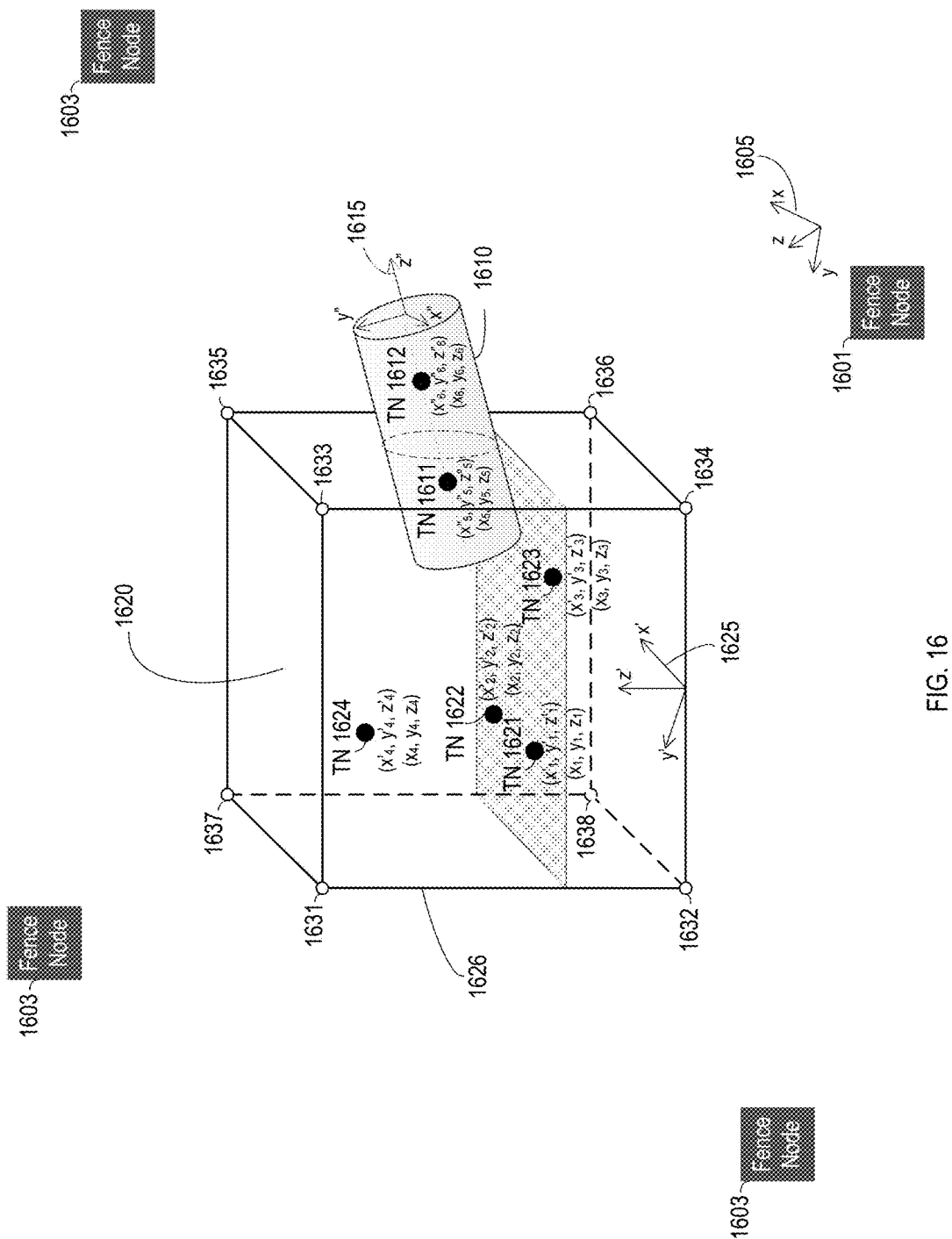
FIG. 16 is schematic illustration of an example fence system with tracked and fenced objects in accordance with aspects of the present disclosure.

FIG. 16 is schematic illustration of an example fence system with a tracked object 1610 and a fenced object 1620 in accordance with aspects of the present disclosure. The techniques described above may be used with the fence system of FIG. 16 including how to set up a fence network having a master fence node and two or more slave fence nodes, how to determine the coordinates of the fence nodes relative to a two-dimensional or three-dimensional coordinate system, how to create a fence or sub-fence around a physical area or region by identifying the vertices of a geometric shape that forms the fence, where such vertices may be co-located with a fence node or identified separately through the use of a location marker, how to determine the coordinates of a transient node relatively to a two-dimensional or three-dimensional coordinate system, and how to monitor a transient node including detecting fence entry or exit.

A distinguishing attribute of tracked and fenced objects is shape. The shape is bound to and, therefore, moves with the object. The orientation and volume (or area if operating in 2-dimensional space) of the shape of a tracked object may be used in conjunction with the object's position to determine whether the object is inside or outside a fence or whether the object's position within the fenced region and orientation are in valid ranges when the object is inside the fence. A fence may be bound to a tracked object to create a fenced object. Such a fence is defined by a shape that is bound to and therefore, moves with the object. A fenced object is inherently also a tracked object. The shape of the fence of a fenced object may be the same or different than the shape used to monitor a pose (position and orientation) of the fenced object as a tracked object.

The fence of a fenced object may be enabled or disabled depending on its current operating conditions, such as its pose relative to its environment, the time of day, its internal operating state such as whether it is active or inactive, or any combination of these or other factors. For example, the fence of a fenced object may be enabled only when the fenced object is active and situated inside a particular other fence or set of fences, and disabled elsewhere or when the fenced object is inactive. The fence of a fenced object may also be enabled or disabled by a mechanism local to the object, such as by configuration via a configuration interface, for example, as above or by a switch that may be physically activated or deactivated. The fence of a fenced object may also be enabled or disabled by the object receiving control information over the fence network or through any another communications interface supported by the object.

The shape of the fence of a fenced object may be different depending on its current operating conditions, such as its pose relative to its environment, the time of day, its internal operating state such as whether it is active or inactive, or any combination of these or other factors. For example, the shape of the fence of a fenced object may be a shape A when the fenced object is inside a particular other fence or set of fences and a shape B elsewhere.

Similarly, the shape of a tracked object may be different depending on its current operating conditions. For example, the shape of a tracked object may be a shape C when the tracked object is inside a particular other fence or set of fences and a shape D elsewhere.

Figure 17:
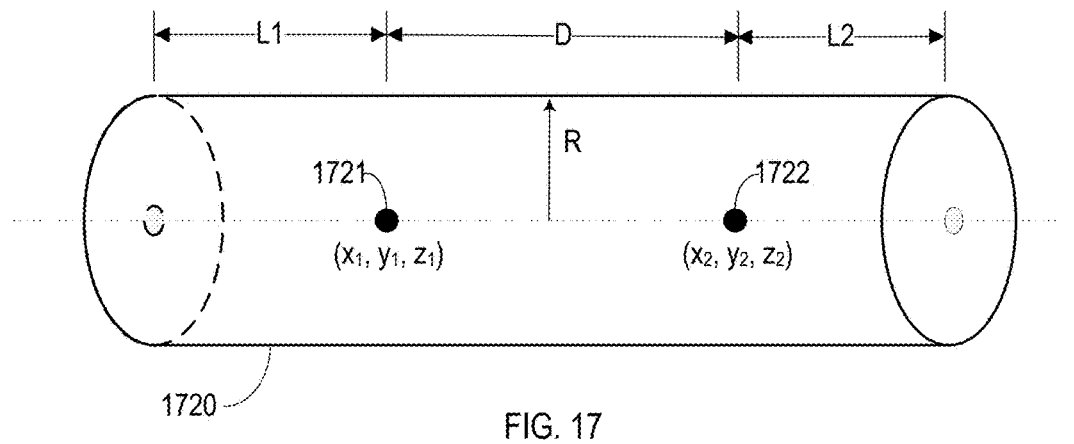
FIG. 17 is a perspective drawing illustrating shape information for an example object in accordance with aspects of the present disclosure.

Each shape associated with a tracked object or fenced object may be described by shape information that captures the shape's topology and orientation relative to the object's reference coordinate system. In FIG. 16, for example, the fenced object 1620 has a fence 1626 that is cuboid shaped and referenced to a fenced object coordinate system 1625, the reference coordinate system of the fenced object. For a cuboid, its shape information may include the coordinates of the vertices 1631 to 1638 and the association of edges to faces. Also, in FIG. 16, the tracked object 1610 has a cylindrical shape that is referenced to a tracked object coordinate system 1615, the reference coordinate system of the tracked object. As shown in FIG. 17, the shape information for a cylinder 1720 may include the coordinates of two reference points 1721 and 1722 on the axis of the cylinder, the cylinder's radius R, and the distances L1 and L2 between each of the two reference points to the nearest end of the cylinder.

The foregoing discussion of exemplary shapes and associated shape information based on rudimentary shapes does not limit the generality of the shapes that may be bound to tracked objects and fenced objects. Shapes may be generally specified and the associated shape information may be defined using methods for solid modeling, such as boundary representation (B-rep), for fence operations in three dimensions, and using methods for contour modeling, such as those discussed above, for fence operations in two dimensions.

Shape information for a tracked object and a fenced object may be stored in and retrieved from the object itself or stored in and retrieved from a server that is accessible via the fence network. If the shape information is stored in a server, retrieval may be keyed on an identifier associated with the tracked object 1610 or fenced object 1620, such as an object type or object identifier. The term "server" includes any device that is accessible from the network and that may contain the shape information associated with tracked and fenced objects and provide this information.

Associated with the tracked object 1610 and the fenced object 1620 is a set of one or more transient nodes, the locations of which may be determined with respect to a fence coordinate system 1605, for example, using methods described above. The transit nodes associated with an object can be monitored as an integral unit. In FIG. 16, the cuboid-shaped fenced object 1620 has four transient nodes TN 1621 to TN 1624 and the cylindrical tracked object 1610 has two transient nodes TN 1611 and TN 1612. The locations of the transient nodes of the object with respect to the fence coordinate system 1605 may be used to determine a transformation function between coordinates specified in the reference coordinate system (tracked object coordinate system 1615, fenced object coordinate system 1625) of the object and the fence coordinate system 1605 as further described below.

Fence Monitoring for Tracked and Fenced Objects

One operation of a geo-fence is to determine the disposition of an object relative to a fence and possibly trigger certain actions related to the object depending on this determination. This operation may be referred to as fence monitoring and is described above with respect to monitoring of individual transient nodes. An individual transient node may be modeled as a tracked object having one transient node and with no shape. Such an object may be referred to as a point tracked object. For tracked objects and fenced objects with non-zero shapes (i.e., that have non-zero volume in three-dimensional space or non-zero area in two-dimensional space), a difference for fence monitoring is in how the shape and pose of such an object may be used to determine the disposition of the object relative to a fence and to trigger actions related to the object based on this determination. Such difference may relate to:

Qualifying the criteria used to determine whether an object is inside or outside a fence with considerations of whether the entire or some fraction of the volume of an object for a three-dimensional fence (or area for a two-dimensional fence) is required for a positive determination;

Qualifying the criteria used to determine whether an object is inside or outside a fence with considerations related to the orientation of the object, such as whether a particular portion of the shape of the object is inside or outside the fence; and Additional criteria used to trigger actions related to the object when it is inside or outside a fence based on the orientation of the object, such as, for example, an object being upright when inside a fence.

Determination of the disposition of a tracked or fenced object relative to a fence may use a determination of the pose of the object in the coordinate system being used for monitoring of the fence. The fence may be one that is set up using a method for fence setup as described above. For such a fence, the coordinate system used for monitoring of tracked and fenced objects may be the fence coordinate system 1605 that provides the reference for the locations of fence nodes, transient nodes, and location markers. The fence may also be one that is bound to a fenced object. For such a fence, the coordinate system used for monitoring of tracked and fenced objects may be the fence coordinate system 1605 or the fenced object coordinate system 1625 of the fenced object to which the fence is bound. Other coordinate systems may also be used with either type of fence.

Figure 18:
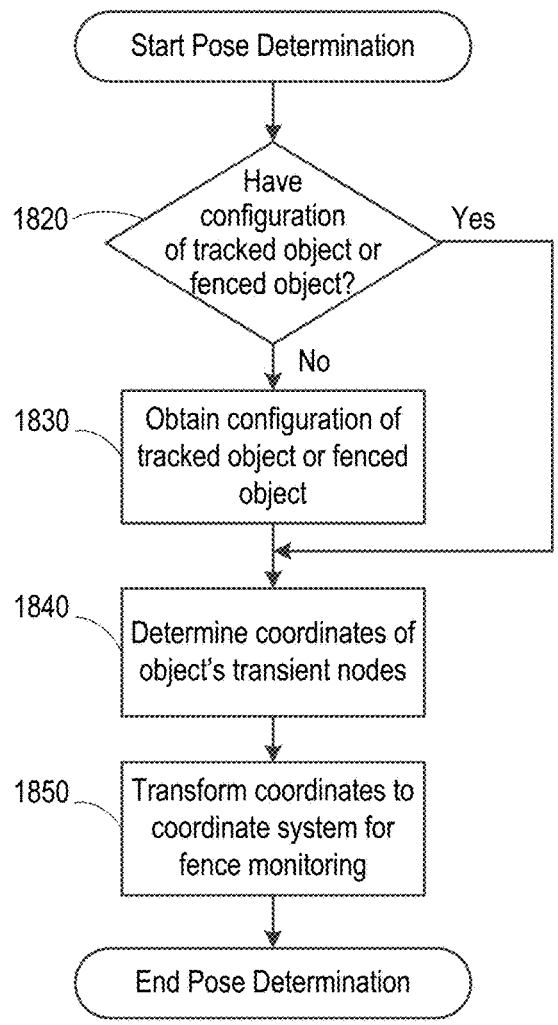
FIG. 18 is a flowchart of a process for pose determination in accordance with aspects of the present disclosure.

FIG. 18 is a flowchart of a process for pose determination in accordance with aspects of the present disclosure. The process may be used with any suitable system but to provide a concrete example it will be described with reference to the fence system of FIG. 16.

Detection of the tracked object 1610 or the fenced object 1620 by the fence network may trigger pose determination of the object in the coordinate system for fence monitoring. Detection may, for example, be based on one or more of the transient nodes of the object establishing communications with the fence network. Such events may be known to the master fence node with the master fence node not yet having a mapping between the transient node or nodes and the object. Detection may alternatively be based on the object providing such information to the master fence node after one or more of the object's transient nodes have established communications with the fence network.

Pose determination may also be triggered when a potential change in pose is detected. For example, a change in the distance to one or more of the transient nodes of the tracked object or fenced object from a fence node may have been detected through distance determination that may be initiated periodically. The distances between a transient node and a fence node may be determined as described above.

In the process of FIG. 18, in step 1820, the process determines if configuration information of the tracked object 1610 or the fenced object 1620 is available. Configuration information may be available, for example, if pose determination had previously been performed for this object or the master fence node has been pre-provisioned with configuration information for the object. If configuration information is available, the process continues to step 1830; otherwise, the process continues directly to step 1840.

In step 1830, the master fence node may query a server for configuration information associated with the object. The configuration information for the object may include:

An identifier for the object
An identifier for the type of object;
The number of transient nodes;
Relevant identifiers associated with each transient node, such as one or more communications protocol identifiers (e.g., MAC identifier);
The location of each transient node with respect to the object's reference coordinate system (e.g., the tracked object coordinate system 1615 for the tracked object 1610 or the fenced object coordinate system 1625 for the fenced object 1620);
  Alternatively or additionally, a transformation derived from the locations of the transient nodes with respect to the object's reference coordinate system;
Shape information including the coordinates of any reference points, such as vertices, with respect to the object's reference coordinate system.
  Alternatively or additionally, shape derived from the shape description with respect to the object's reference coordinate system, where the shape information with respect to the fence coordinate system 1605 has been partially precomputed.

Equivalently, the master fence node may obtain some or all of this configuration information by querying the object or by the object autonomously providing such information in response to an event, such as on initially establishing communications with the fence network.

In step 1840, the coordinates of the transient nodes of the object referenced to fence coordinate system 1605 are determined, for example, using methods described above.

In step 1850, the pose of the fence and pose of the object are established in the coordinate system for fence monitoring. This may include transforming the coordinates of any reference points, such as vertices, in the shape information for the fence or the object from the coordinate system in which the coordinates are specified to the coordinate system for fence monitoring. For example, if the coordinate system for fence monitoring is the fence coordinate system 1605, then the coordinates of any reference points in the shape information for the object would be transformed from the tracked object coordinate system 1615 or the fenced object coordinate system 1625 to the fence coordinate system 1605.

In step 1850, the coordinate system for fence monitoring for the object may be different than fence coordinate system 1605. For example, if the fence being monitored is one that is bound to a fenced object, the coordinate system for fence monitoring may be the reference coordinate system for that fenced object. In this case, the coordinate transformation applied to the object being monitored may comprise two transformations, firstly from the reference coordinate system of the object being monitored to the fence coordinate system 1605, and then from the fence coordinate system 1605 to the fenced object coordinate system 1625, the reference coordinate system of the fenced object to which the fence is bound.

In step 1850, the coordinate system for fence monitoring may be the reference coordinate system of the object being monitored. For example, if the object being monitored is stationary and if the shape information of the fence contains fewer reference points than the shape information for the object being monitored, using the monitored object's reference coordinate system instead of the fence coordinate system 1605 for fence monitoring may reduce the total number of mathematical operations involved in coordinate transformations. In this case, the coordinate transformation is applied to the fence and is from the fence coordinate system 1605 to the tracked object coordinate system 1615 or the fenced object coordinate system 1625.

Coordinate transformation is enabled by having the coordinates of the transient nodes of the tracked object 1610 or the fenced object 1620 both referenced to the reference coordinate system of the object and to the fence coordinate system 1605 as obtained in step 1820 and step 1830, respectively. These known coordinates may be used to derive the transformation function between the two coordinate systems. For example, coordinate transformation is commonly modeled as the combination of an axis rotation about the origin and a displacement between the origins:

$$v'=Av+d \qquad \text{Eq. (1)}$$

in which the transformation is from a coordinate system 1 to coordinate system 2, v is the coordinates of a point referenced to coordinate system 1, v' is the coordinates of the point referenced to coordinate system 2, A is the transformation matrix that applies the required rotation about the origin, and d is the displacement between the origins referenced to coordinate system 2. In this case, knowing the coordinates of the transient nodes in both coordinate systems enables determinations of A and d in Eq. (1).

Enabling coordinate transformations, such as determinations of A and d via Eq. (1), requires knowing the coordinates of four non-coplanar points in both coordinate systems for three-dimensional transformations (and likewise, three non-collinear points for two dimensional transformations). Therefore, this would require a minimum of four transient nodes for objects that may operate with three-dimensional fences. However, if a fourth point is defined relatively to the other three points in a manner that may be readily derived from the coordinates of these three points in either coordinate system, only three transient nodes are required to enable coordinate transformation in three dimensions. An example of how this may be defined is provided below. Using a similar approach for two-dimensional fences would require only two transient nodes in a tracked or fenced object.

Furthermore, if the number of degrees of freedom for the pose of a tracked or fenced object is reduced, the coordinate transformation may be enabled with only two transient nodes. For example, only two transient nodes are needed if the possible orientations of the object are constrained to rotation on the horizontal plane and if the transient nodes are not vertically aligned. An example of how this may be achieved is also provided below.

For objects with shapes that exhibit spherical or circular symmetry, the pose of the object may be determined directly in the coordinate system for fence monitoring using a minimum number of transient nodes less than three for three-dimensional monitoring (or less than two for two-dimensional monitoring). For example, if the shape is a sphere (circle for two-dimensional monitoring), the pose and volume of the object may be fully specified by a transient node located at the sphere's (circle's) center and the radius of the sphere (circle). If the coordinate system for fence monitoring is the fence coordinate system 1605, the pose of the object is fully determined when the location of the object's transient node is determined in step 1840 since there is no distinct orientation with respect to the sphere's (circle's) center. In another example, if the shape is a cylinder, such as that shown in FIG. 17, the pose and volume of the object may be fully specified by two transient nodes located on the axis of the cylinder, the radius R of the circular cross-section and the distances, L1 and L2, from each transient node to the nearest end of the cylinder as measured along the axis. The distance D between the transient nodes may be explicitly specified or calculated as the magnitude of the vector subtraction between the coordinates of the two transient nodes. If the coordinate system for fence monitoring is the fence coordinate system 1605, the pose of the object is fully determined when the locations of the object's two transient nodes are determined in step 1840 since the position and orientation of the axis of the cylinder would have been fully determined with respect to the fence coordinate system 1605.

After completion of pose determination, the disposition of the tracked object 1610 or the fenced object 1620 with respect to the fence may be determined. Except for point tracked objects, the non-zero and possibly irregular shape of an object enables different criteria for determining whether the object is inside or outside the fence. For example, an object may be deemed to be inside the fence when:

The entire shape of the object is within the boundary of the fence;

A certain percentage of the volume of the object is within the boundary of the fence (or area of the object for a two-dimensional fence); or A specific portion of the object is within the boundary of the fence for an object in which portions of the object are distinguishable based on the pose.

Evaluation of criteria for determining whether an object is inside a fence may be based on which of the object's transient nodes are within the boundary of the fence. Methods may also be employed from computational geometry, such as Boolean operations on solids using constructive solid geometry (CSG) or B-rep, or on areas using polygons or constructive area geometry, and algorithms for determining the volume of a solid or the area of a two-dimensional shape.

Similar variations in criteria may be applied to determine whether an object is outside a fence. The same or different criteria for determining whether an object is inside or outside a fence may be applied on a system-wide basis, on specific sets of fences, or on a fence-by-fence basis.

Furthermore, the same or different criteria for triggering certain behavior due to a detected change in the disposition of an object with respect to a fence may be applied on a system-wide basis, on specific sets of fences, or on a fence-by-fence basis. Examples of such criteria may include first detection of an object being inside or outside a fence and detection of an object entering or exiting a fenced region.

In addition, an object having a shape with a distinctive orientation in one or more dimensions may trigger certain operations involving the object when its orientation is in a certain range while the object is detected to be inside a fence. For example, in the exemplary fence system of FIG. 16, if the tracked object 1610 has been determined to be inside the fence 1626 of the fenced object 1620, certain operations involving the tracked object 1610 may be enabled or disabled depending on whether or not the axis of the object's cylindrical shape is pointing in a certain direction to within some range of tolerance.

The same or different ranges of orientation that may trigger certain operations involving a tracked or fenced object within a fence may be applied on a system-wide basis, on specific sets of fences, or on a fence-by-fence basis.

Additionally, descriptions above pertaining to fences apply similarly to sub-fences within fences.

In the above description, the master fence node performs fence monitoring. Fence monitoring may be performed by another device, such as a computer, or combination of devices that can communicate with fence nodes via the fence network.

Monitoring of Fences Bound to Fenced Objects

Figure 19:
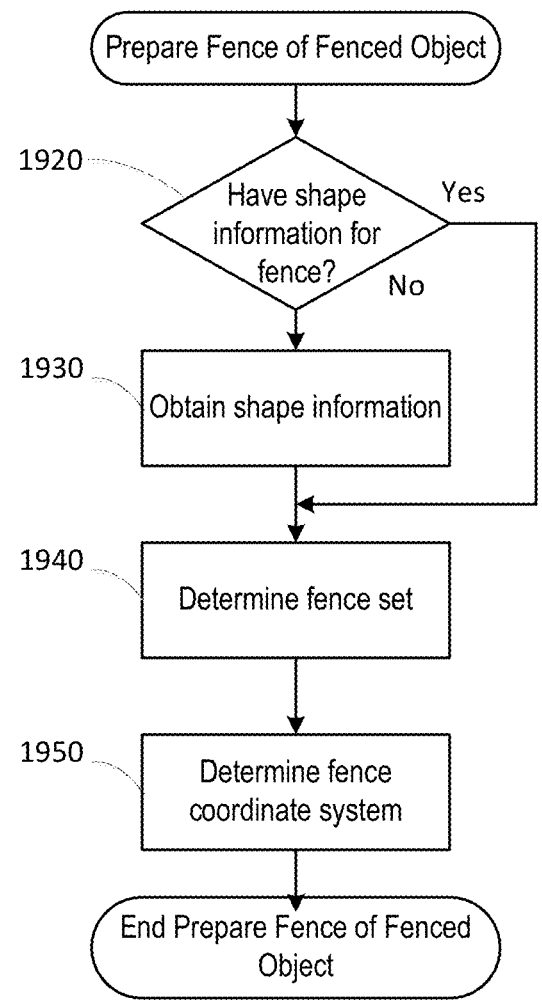
FIG. 19 is a flowchart of a process for preparing a fence of a fenced object for monitoring in accordance with aspects of the present disclosure.

FIG. 19 is a flowchart of a process for preparing a fence of a fenced object for monitoring in accordance with aspects of the present disclosure. The process may be used with any suitable system but to provide a concrete example will described with reference to the fence system of FIG. 16 and the process of FIG. 18.

In step 1920, the process determines if shape information that describes the fence is available. If the shape information that describes the fence is not yet available, for example, as previously determined in step 1830, this information is obtained in step 1930. Methods for obtaining configuration information for a fenced object as described above may be applied in step 1930.

In step 1940, a set of fence nodes is selected by the master fence node or other node performing fence coordination for the object's fence. The set of fence nodes may be referred to as a fence set. A subset of the fence nodes in the fence set is used to determine the locations of transient nodes of tracked objects or other fenced objects for the purpose of monitoring with respect to the shape of the object's fence. The locations of the fence nodes in the fence set are known in a default coordinate system, where this coordinate system is the coordinate system used for monitoring of the fence with respect to which the fenced object is being tracked, or is the coordinate system used for the determination of fence-node locations independent of any fence if the fenced object is not being tracked with respect to any fence. These known coordinates were previously determined, for example, as described above, or if the fenced object is situated in the fence of another fenced object, according to step 1950 in this flow for this other fenced object.

In step 1950, the fence coordinate system 1605 to be used for monitoring of this fence is determined. In an embodiment, the default coordinate system is also applied for monitoring of the fence of the fenced object. In this case, no further adjustments are necessary and fence monitoring may proceed as described above. In another embodiment, e.g., when the fence object is stationary, the fenced object coordinate system 1625 of the fenced object 1620 is used as the fence coordinate system. In this case, the coordinates of the fence nodes in the fence set are transformed from the default coordinate system for fence monitoring to the fenced object coordinate system 1625. Thereafter, fence monitoring proceeds as described above.

Self-Enabled Fenced Objects

A fenced object may include one or more fence nodes and therefore, may participate in fence operations as part of a fence set. This enhanced type of fenced object is referred to as a self-enabled fenced object (SFO).

Figure 20:
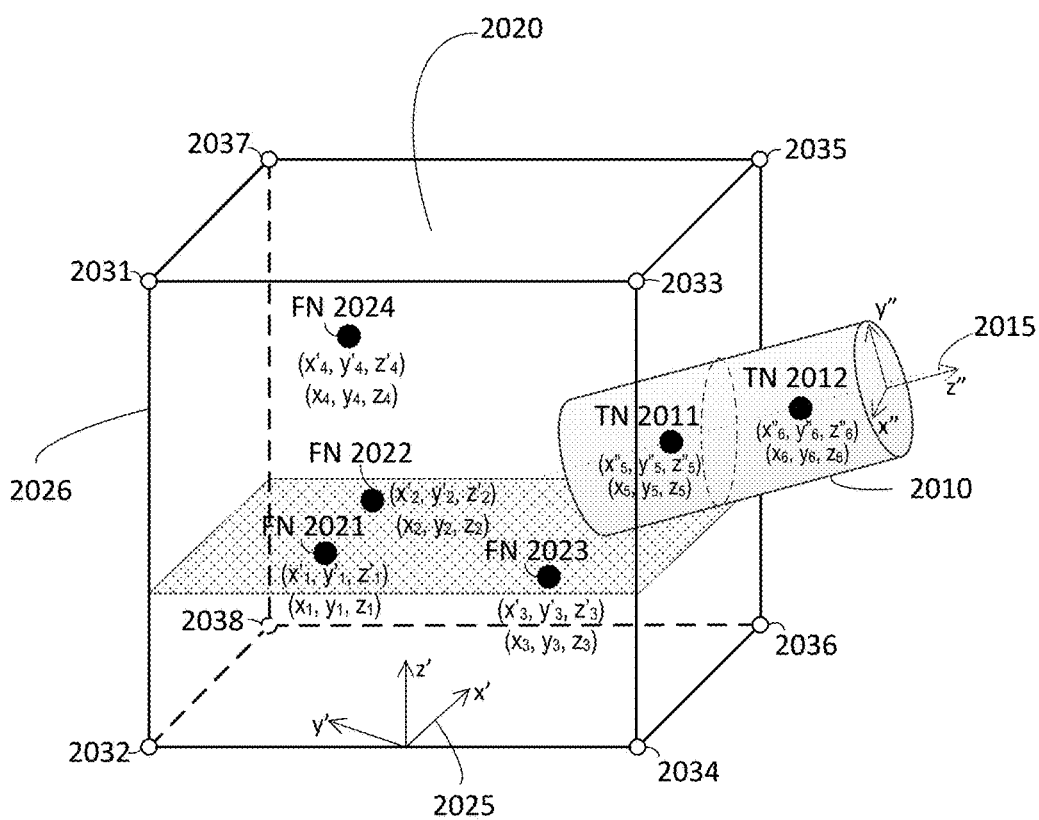
FIG. 20 is a is schematic illustration of an example fence system with a tracked object and self-enabled fenced object in accordance with aspects of the present disclosure in accordance with aspects of the present disclosure.

FIG. 20 is a is schematic illustration of an example fence system with a tracked object and a self-enabled fenced object in accordance with aspects of the present disclosure in accordance with aspects of the present disclosure.

If an SFO includes a master fence node and a sufficient number of slave fence nodes, the SFO may independently operate a fence that is bound to the object as a self-contained fence set. For example, an SFO with one master fence node and three or more slave fence nodes may independently operate a three-dimensional fence, such as illustrated in FIG. 20. FIG. 20 depicts a similar scenario to that shown in FIG. 16 with like referenced elements having like functions. In the fence system of FIG. 20, a self-enabled fenced object 2020 takes the place of the fenced object 1620. To support fence operations in three dimensions, SFO 2020 includes four non-coplanar fence nodes FN 2021 to FN 2024, one of which would be a master fence node. Since SFO 2020 has a sufficient number and topology of fence nodes to operate as a self-contained fence set, no other fence nodes from the environs is required for SFO 2020 to monitor tracked objects with respect to fence 2026.

An SFO with a self-contained fence set may also operate fences that are not bound to the object but that are defined in the object's environs. The configuration of such fences may be provided to the SFO according to methods described above.

The fence nodes of an SFO may also operate as part of a fence set that includes other fence nodes in the environs. For example, an SFO with a cylinder-shaped fence such as that shown in FIG. 17 may include only two fence nodes (e.g., due to physical placement restrictions) and therefore, cannot operate as a self-contained fence set. However, a sufficient fence set may be achieved with the inclusion of at least two other fence nodes available in the object's environs. In another example, an SFO with a self-contained fence set may include other fence nodes available in the environs to the fence set in order to improve fence operations, such as to improve location determination accuracy in the presence of radio frequency impairments, such as shadowing, in the environment.

Fence monitoring for fences bound to an SFO may follow in general the methods described above for fence monitoring for tracked and fenced objects and monitoring of fences bound to fenced objects. A difference is with the monitoring for fences operated by a self-contained fence set of an SFO where in step 1850, there may be no need for a coordinate transformation between the SFO's object coordinate system 2025 and a fence coordinate system since they are the same.

Object Architecture

A tracked object or fenced object includes one or more transient nodes placed at predetermined locations on or about a physical object. The minimum number of transient nodes required depends on the number of dimensions used in fence monitoring and on the number of degrees of freedom for the orientation and the symmetries of the shape of the tracked or fenced object. For example, for monitoring in three dimensions, a minimum of three transient nodes are required in order for the fence network to unambiguously determine a fourth non-coplanar reference point for the object and thereby enable transformation of coordinates given in the object's reference coordinate system to the fence coordinate system 1605. As described above, fewer than three transient nodes may be sufficient for tracked and fenced objects with certain highly symmetrical shapes.

A self-enabled fenced object may also include one or more fence nodes. The same or different hardware components may be used to provide transient node and fence node capabilities. In an embodiment, if the same hardware is used to provide both capabilities, the capability that is active may depend on the state of operation. For example, the transient node capability may be active when a self-enabled fenced object is connected to a fence network comprising other fence nodes in the object's environs, whereas the fence node capability is active when the object is not connected to such a fence network. Alternatively, the capability that is active may be controlled by configuration of the self-enabled fenced object by means as described above.

The placement of the transient nodes, and fence nodes in the case of a self-enabled fenced object, may be restricted by where such nodes may be attached to the physical object. For example, if the physical object is a table and fence monitoring is in three dimensions, three transient/fence nodes may be placed at corners, edges, or a combination of corners and edges of the table surface and a fourth transient/fence node may be placed on a leg of the table.

Each transient or fence node may include components according to the exemplary node as described above. Other architectures are possible as long as there is one fence network communications interface for each transient or fence node so that each may communicate as a distinct entity on the fence network. For example, instead of each transient or fence node including all components as described above, there may be one fence network communications interface at the location of each transient or fence node and there may be one instance of each of the other components for the entire object with this set of other components co-located with a fence network communications interface at one of the transient or fence node locations or located elsewhere on the physical object.

Coordinate Transformations

Figure 21:
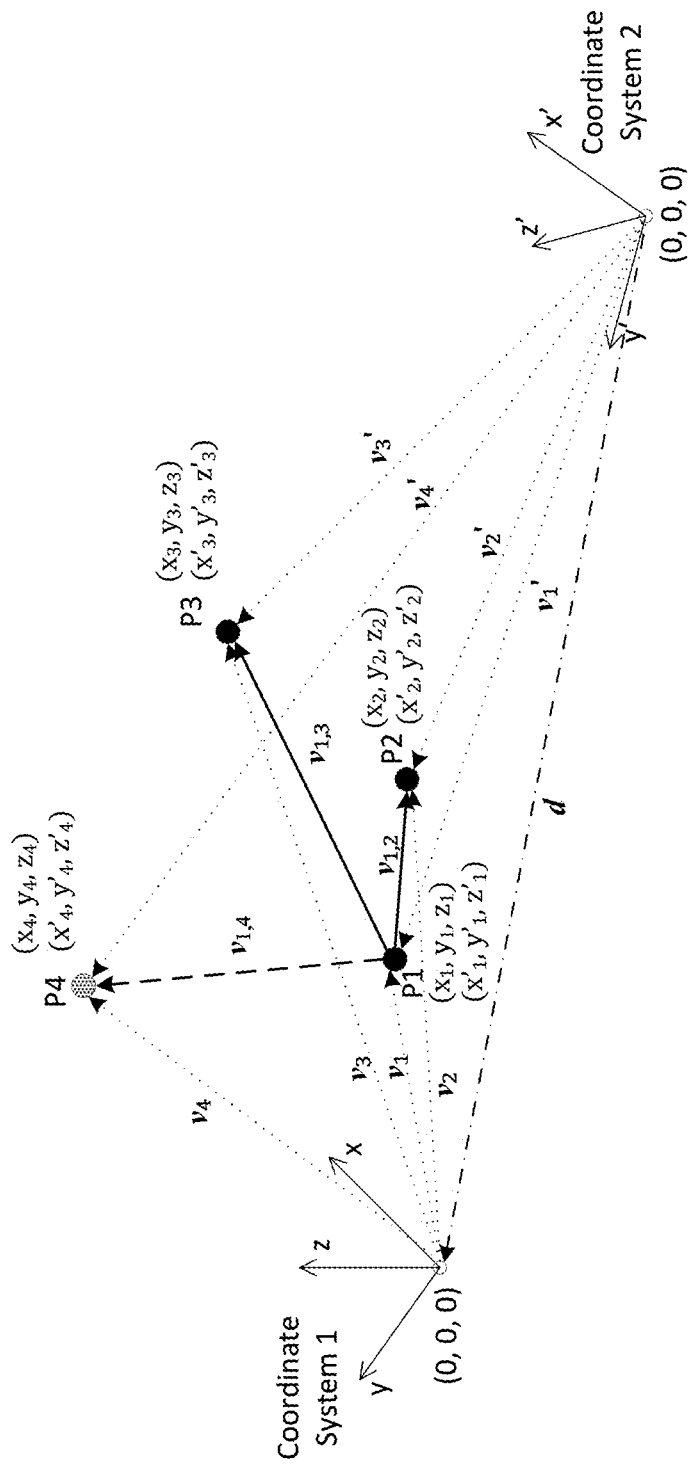
FIG. 21 is a pictorial illustration of an example 3-D coordinate transformation in accordance with aspects of the present disclosure.

FIG. 21 illustrates a scenario in which a three-dimensional coordinate transformation is desired from an orthonormal coordinate system 1 to an orthonormal coordinate system 2 where the coordinates of three points P1, P2, and P3 are known in both coordinate systems.

For the general case where there is a displacement d between the origins of the two coordinate systems, the transformation requires a minimum of four non-coplanar points with known coordinates in both coordinate systems. However, it is possible to satisfy the minimum number of known non-coplanar points by explicitly knowing the coordinates of three points only and deriving the fourth point as a non-coplanar point relative to these three points. An example of how this may be achieved is shown in FIG. 21 where the location of the fourth non-coplanar point, P4, is determined by taking the cross-product of the two vectors originating from one of the three points, such as P1, to the other two points (i.e., $v_{1,4}=v_{1,2} \times v_{1,3}$). Since $v_{1,2}$ and $v_{1,3}$ can be expressed in terms of the coordinate vectors in either coordinate system (e.g., $v_{1,2}=v_2-v_1$ and $v_{1,2}=v_2'-v_1'$), the resulting vector $v_{1,4}$ may be determined based on the known coordinates of the three points P1 to P3 in either coordinate system. Therefore, the coordinates of P4 may be determined in coordinate system 1 as $v_4=v_1+v_{1,4}$ and similarly in coordinate system 2 as $v_4'=v_1'+v_{1,4}$.

With coordinates known for four non-coplanar points in both coordinate systems, the transformation function according to Eq. (1) above may be solved for A and d. One method of doing this is to firstly solve for A by eliminating d. This can be done by performing the rotation transformation Av in Eq. (1) at one of the known points, such as P1, by translating coordinate system 2 such that its origin is located at that point. Selecting P1, the resulting coordinates referenced to the translated coordinate system are:

$$v''=v'-v_1'=Av+d-v_1'$$

Since $v_1'=Av_1+d$, we have:

$$v'-v_1'=Av-Av_1=A(v-v_1)$$

Therefore, by applying this coordinate system translation to each of the other three known points, we have:

$$v_2'-v_1'=A(v_2-v_1)$$

$$v_3'-v_1'=A(v_3-v_1)$$

$$v_4'-v_1'=A(v_4-v_1)$$

This may be rewritten as a single matrix operation:

$$C = AB$$

in which $$B = [(v_2 - v_1), (v_3 - v_1), (v_4 - v_1)]$$

and $$C = [(v_2' - v_1'), (v_3' - v_1'), (v_4' - v_1')]$$

As a result, $$A = CB^{-1}$$

in which B is invertible if and only if P1 through P4 are non-coplanar, which is the case here. Since we have A, it follows from Eq. (1) that:

$$d = v_1' - Av_1$$

When the coordinate system 1 is the reference coordinate system of a tracked object or fenced object, the matrix $B^{-1}$ may be precomputed, which avoids a matrix inversion while tracking the object and, thus, allows for a faster determination of the matrix A.

Furthermore, since, $$Av + d = C(B^{-1}(v - v_1)) + v_1'$$

$B^{-1}(v - v_1)$ may be precomputed for every shape vertex v, thus enabling even faster determination of the shape vertices in coordinate system 2. More generally, if S is a shape specified with respect to coordinate system 1, the shape with respect to coordinate system 2 is CS'+$v_1$', where S' is precomputed:

$$S' = B^{-1}(S - v_1)$$

When the number of degrees of freedom for the pose of an object is reduced, the three-dimensional coordinate transformation may be enabled with only two known points. For example, if coordinate system 1 and coordinate system 2 have aligned z-axes and changes in the orientation of the three-dimensional object is restricted to rotation about the z-axis, and if P1 and P2 are not aligned vertically (i.e., the line between P1 and P2 is not parallel to the z-axis), then a point P3 may be derived from P1 and P2 by rotating P2 90 degrees around a normal to the vertical plane through P1 and P2 passing through P1. Once P3 is determined, determination of P4 and the transformation matrix A and displacement d may proceed as above.

As described herein, various systems, devices, and methods are described as working to optimize particular parameters, functions, or operations. This use of these terms does not necessarily mean to be taken in an abstract theoretical or global sense. Rather, the systems, devices, and methods may work to optimize performance using algorithms that are expected to improve performance in at least many common cases. For example, a system may work to optimize performance judged by particular functions or criteria. Similar terms like minimize or maximize are used in a like manner.

Those of skill will appreciate that the various illustrative logical blocks, modules, units, and algorithm steps described in connection with the aspects disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention. Aspects implemented as software may utilize instructions stored on non-transitory computer readable media.

The various illustrative logical blocks, units, steps and modules described in connection with the aspects disclosed herein can be implemented or performed with a processor, such as a general purpose processor, a multi-core processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the aspects disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

What is claimed is:

1. A method for tracking an object having associated shape information, the method comprising:
   detecting establishment of communications between at least one of a plurality of fence nodes associated with a fence network and at least one of a plurality transient nodes associated with a tracked object;
   estimating distances between at least two of the plurality transient nodes and at least two of the plurality of fence nodes;
   determining a pose of the tracked object in a fence coordinate system associated with the fence network using the estimated distances, wherein the pose includes a position of the tracked object and an orientation of the tracked object; and
   determining a disposition of the tracked object relative to a fence associated with the fence network based on the determined pose and on the shape information associated with the tracked object.

2. The method of claim 1, wherein the shape information associated with the tracked object is dynamic based at least in part on the determined pose.

3. The method of claim 1, wherein determining the disposition of the tracked object relative to the fence associated with the fence network includes determining whether a portion of the tracked object is inside the fence and another portion of the tracked object is outside the fence.

4. The method of claim 1, further comprising initiating an action based on the disposition of the tracked object relative to the fence associated with the fence network.

5. The method of claim 1, further comprising obtaining configuration information associated with the tracked object from a server, the configuration information including the shape information and locations of the plurality transient nodes in a reference coordinate system associated with the tracked object.

6. The method of claim 5, further comprising transforming the shape information from the reference coordinate system associated with the tracked object to the fence coordinate system.

7. A method for tracking an object having associated shape information with respect to a fence associated with another object, the method comprising:
 detecting establishment of communications between at least one of a plurality of fence nodes associated with a fence network and at least one of a plurality transient nodes associated with a tracked object;
 estimating distances between at least two of the plurality transient nodes associated with the tracked object and at least two of the plurality of fence nodes;
 determining a pose of the tracked object using the estimated distances, wherein the pose includes a position of the tracked object and an orientation of the tracked object, and wherein the pose of the tracked object is determined in a fence coordinate system associated with the fence network;
 detecting establishment of communications between at least one of the plurality of fence nodes and at least one of a plurality transient nodes associated with a fenced object;
 estimating distances between at least two of the plurality transient nodes associated with the fenced object and at least two of the plurality of fence nodes;
 determining a pose of the fenced object using the estimated distances, wherein the pose includes a position of the fenced object and an orientation of the fenced object, and wherein the pose of the fenced object is determined in the fence coordinate system associated with the fence network; and
 determining a disposition of the tracked object relative to a fence associated with the fenced object based on the determined pose of the tracked object and the determined pose of the fenced object.

8. The method of claim 7, wherein determining the disposition of the tracked object relative to the fence associated with the fenced object includes:
 transforming the shape information associated with the tracked object from a reference coordinate system associated with the tracked object to the fence coordinate system; and
 transforming the shape information associated with the tracked object in the fence coordinate system to a reference coordinate system associated with the fenced object.

9. A fence system, comprising:
 a fence network associated with a first fence in a fence coordinate system, the fence network having a first plurality of fence nodes having locations defined in the fence coordinate system; and
 a tracked object having a first plurality of transient nodes and associated shape information,
 wherein the fence system is configured to determine a pose of the tracked object using estimated distances between at least two of the first plurality transient nodes and at least two of the plurality of fence nodes, the pose including a position and an orientation of the tracked object in the fence coordinate system,
 wherein the fence system is further configured to determine a disposition of the tracked object relative to the first fence based on the determined pose and on the shape information associated with the tracked object.

10. The fence system of claim 9, wherein the shape information associated with the tracked object is dynamic based at least in part on the determined pose of the tracked object.

11. The fence system of claim 9, wherein determining the disposition of the tracked object relative to the first fence includes determining whether a portion of the tracked object is inside the first fence and another portion of the tracked object is outside the first fence.

12. The fence system of claim 9, wherein the fence system is further configured to transform the shape information from a reference coordinate system associated with the tracked object to the fence coordinate system using configuration information associated with the tracked object, the configuration information including locations of the first plurality transient nodes in the reference coordinate system associated with the tracked object.

13. The fence system of claim 9, further comprising
 a fenced object having a second plurality of transient nodes having locations defined in a reference coordinate system associated with the fenced object, the fenced object associated with a second fence defined in the reference coordinate system associated with the fenced object,
 wherein the fence system is further configured to determine a pose of the fenced object using estimated distances between at least two of the second plurality transient nodes and at least two of the plurality of fence nodes, the pose including a position and an orientation of the fenced object in the fence coordinate system.

14. The fence system of claim 13, wherein the fence system is further configured to determine a disposition of the tracked object relative to the second fence using the pose and the shape information associated with the tracked object and the pose of the fenced object.

15. The fence system of claim 14, wherein determining the disposition of the tracked object relative to the second fence includes:
 transforming the shape information associated with the tracked object from a reference coordinate system associated with the tracked object to the fence coordinate system; and
 transforming the shape information associated with the tracked object in the fence coordinate system to the reference coordinate system associated with the fenced object.

16. The fence system of claim 15, wherein determining the disposition of the tracked object relative to the second fence includes determining whether a portion of the tracked object is inside the second fence and another portion of the tracked object is outside the first fence.

* * * * *